US008154739B2

(12) United States Patent
Sugahara

(10) Patent No.: US 8,154,739 B2
(45) Date of Patent: Apr. 10, 2012

(54) PRINTER AND IMAGE OUTPUT APPARATUS

(75) Inventor: Hiroto Sugahara, Aichi-ken (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 888 days.

(21) Appl. No.: 12/221,264

(22) Filed: Aug. 1, 2008

(65) Prior Publication Data

US 2009/0033951 A1 Feb. 5, 2009

(30) Foreign Application Priority Data

Aug. 2, 2007 (JP) ................................ 2007-202000

(51) Int. Cl.
*G06F 3/12* (2006.01)
*G03G 15/00* (2006.01)

(52) U.S. Cl. ...................................... 358/1.13; 399/158

(58) Field of Classification Search .................. 358/1.1, 358/468, 1.18, 1.16, 401, 1.11, 1.13; 345/156, 345/204; 399/1, 9, 158
See application file for complete search history.

(56) References Cited

U.S. PATENT DOCUMENTS

| | | | | |
|---|---|---|---|---|
| 5,345,403 | A * | 9/1994 | Ogawa et al. | 361/679.26 |
| 5,510,810 | A | 4/1996 | Nishijima et al. | |
| 6,011,634 | A * | 1/2000 | Aihara et al. | 358/468 |
| 6,788,292 | B1 | 9/2004 | Nako et al. | |
| 7,946,183 | B2 * | 5/2011 | Sugahara | 73/849 |
| 2001/0055121 | A1 | 12/2001 | Omura et al. | |
| 2004/0008191 | A1 | 1/2004 | Poupyrev et al. | |
| 2004/0184823 | A1 * | 9/2004 | Fujii et al. | 399/9 |
| 2004/0212602 | A1 | 10/2004 | Nako et al. | |
| 2004/0239633 | A1 | 12/2004 | Kogoh et al. | |
| 2005/0151782 | A1 | 7/2005 | Ishida et al. | |
| 2006/0176497 | A1 | 8/2006 | Kimura et al. | |
| 2007/0002290 | A1 | 1/2007 | Muraki et al. | |
| 2007/0236751 | A1 * | 10/2007 | Nagasaka | 358/442 |
| 2008/0030530 | A1 | 2/2008 | Ishida et al. | |
| 2008/0316541 | A1 * | 12/2008 | Takata et al. | 358/401 |
| 2009/0033951 | A1 * | 2/2009 | Sugahara | 358/1.1 |
| 2009/0084190 | A1 * | 4/2009 | Sugahara | 73/849 |

FOREIGN PATENT DOCUMENTS

| | | |
|---|---|---|
| DE | 10001768 | 8/2000 |
| JP | 6-150778 | 5/1994 |
| JP | 7-14475 | 1/1995 |
| JP | 7084721 | 3/1995 |
| JP | 8-19663 | 1/1996 |
| JP | 10254604 | 9/1998 |
| JP | 11242539 | 9/1999 |
| JP | 11-177324 | 10/1999 |
| JP | 11312041 | 11/1999 |
| JP | 2004-021528 | 1/2004 |

(Continued)

*Primary Examiner* — Jerome Grant, II

(74) *Attorney, Agent, or Firm* — Frommer Lawrence & Haug LLP

(57) ABSTRACT

A printer includes a display displaying an image of predetermined image data selected from a plurality of image data sorted in order; a recording head recording the image of the image data on printing paper; and a plate-shaped operation tab rotatably attached to an attachment surface of a body. Based on a rotation operation to the operation tab detected by a rotary encoder, image data to be image-displayed on the display is switched according to the order of the image data. Consequently, it is possible to provide a printer which can be easily operated even by users not good at operating device when they want to display desired image data among the plural image data.

27 Claims, 28 Drawing Sheets

FOREIGN PATENT DOCUMENTS

| | | |
|---|---|---|
| JP | 2005-252742 | 9/2005 |
| JP | 2006-035662 | 2/2006 |
| JP | 2006-218845 | 8/2006 |
| WO | WO 2004/067286 | 8/2004 |

* cited by examiner

Fig. 4

(DISPLAY IMAGE SWITCHING PROCESS)

| PROCESSING | USER'S OPERATION (STATE OF OPERATION KNOB) | DISPLAY |
|---|---|---|
| A | STANDBY POSITION | DISPLAY IMAGE FOLDER NAME |
| B | RIGHT ROTATION (LOW ROTATION SPEED) | SWITCH TO IMMEDIATELY SUBSEQUENT IMAGE |
| C | LEFT ROTATION (LOW ROTATION SPEED) | SWITCH TO IMMEDIATELY PRECEDING IMAGE |
| D | RIGHT ROTATION (HIGH ROTAION SPEED) | NO SWITCHING |
| E | LEFT ROTATION (HIGH ROTATION SPEED) | NO SWITCHING |

Fig. 5

(IMAGE SELECTION PROCESS)

| PROCESSING | USER'S OPERATION | FIRST PRESSURE SENSOR | SECOND PRESSURE SENSOR | PROCESSING CONTENTS |
|---|---|---|---|---|
| A | PULL | – | – | START RECORDING OF DISPLAYED IMAGE |
| B | PUSH | + | + | CANCEL RECORDING OF DISPLAYED IMAGE |
| C | PULL LOWER END (STRONG) | NO CHANGE | – (STRONG) | NUMBER OF RECORDING COPIES +5 |
| D | PULL LOWER END (WEAK) | NO CHANGE | – (WEAK) | NUMBER OF RECORDING COPIES +1 |
| E | PULL UPPER END (STRONG) | – (STRONG) | NO CHANGE | NUMBER OF RECORDING COPIES –5 |
| F | PULL UPPER END (WEAK) | – (WEAK) | NO CHANGE | NUMBER OF RECORDING COPIES –1 |
| G | ROTATE TO NEAR SIDE | – | + | ROTATE DISPLAYED IMAGE RIGHT |
| H | ROTATE TO FAR SIDE | + | – | ROTATE DISPLAYED IMAGE LEFT |

NOTE) "+": INCREASE IN PRESSING FORCE TO PRESSURE SENSOR (DECREASE IN ELECTRIC RESISTANCE VALUE)

"–": DECREASE IN PRESSING FORCE TO PRESSURE SENSOR (INCREASE IN ELECTRIC RESISTANCE VALUE)

Fig. 6

(DISPLAY IMAGE SWITCHING PROCESS)

| PROCESSING | USER'S OPERATION (STATE OF OPERATION KNOB) | DISPLAY |
|---|---|---|
| A | STANDBY POSITION | DISPLAY IMAGE FOLDER NAME |
| B | RIGHT ROTATION (LOW ROTATION SPEED) → LEFT ROTATION (HIGH ROTATION SPEED) | SWITCH TO IMMEDIATELY SUBSEQUENT IMAGE |
| C | LEFT ROTATION (LOW ROTATION SPEED) → RIGHT ROTATION (HIGH ROTATION SPEED) | SWITCH TO IMMEDIATELY PRECEDING IMAGE |

Fig. 12

(IMAGE FOLDER SELECTION PROCESS)

| PROCESSING | USER'S OPERATION | FIRST PRESSURE SENSOR | SECOND PRESSURE SENSOR | PROCESSING CONTENTS |
|---|---|---|---|---|
| A | PUSH CENTER PORTION | + | + | SELECT CURRENTLY DISPLAYED FOLDER |
| B | PUSH UPPER END PORTION | + | NO CHANGE | SWITCH TO IMMEDIATELY PRECEDING IMAGE |
| C | PUSH LOWER END PORTION | NO CHANGE | + | SWITCH TO IMMEDIATELY SUBSEQUENT IMAGE |

Fig. 16

(IMAGE SELECTION PROCESS)

| PROCESSING | USER'S OPERATION | FIRST MECHANICAL SWITCH | SECOND MECHANICAL SWITCH | PROCESSING CONTENTS |
|---|---|---|---|---|
| A | PULL | ON → OFF | ON → OFF | START RECORDING OF DISPLAYED IMAGE |
| B | PULL LOWER END | ON | ON → OFF | NUMBER OF RECORDING COPIES +1 |
| C | PULL UPPER END | ON → OFF | ON | NUMBER OF RECORDING COPIES −1 |

Fig. 22

(DISPLAY IMAGE SWITCHING PROCESS)

| PROCESSING | USER'S OPERATION (STATE OF OPERATION KNOB) | PIEZOELECTRIC ELEMENT | | DISPLAY |
|---|---|---|---|---|
| | | PIEZOELECTRIC LAYER DEFORMATION | GENERATED VOLTAGE | |
| A | STANDBY POSITION | NONE | 0 | DISPLAY IMAGE FOLDER NAME |
| B | RIGHT ROTATION (LOW ROTATION SPEED) | COMPRESS (SMALL) | − (LOW) | SWITCH TO IMMEDIATELY SUBSEQUENT IMAGE |
| C | LEFT ROTATION (LOW ROTATION SPEED) | STRETCH (SMALL) | + (LOW) | SWITCH TO IMMEDIATELY PRECEDING IMAGE |
| D | RIGHT ROTATION (HIGH ROTATION SPEED) | COMPRESS (LARGE) | − (HIGH) | NO SWITCHING |
| E | LEFT ROTATION (HIGH ROTATION SPEED) | STRETCH (LARGE) | + (HIGH) | NO SWITCHING |

Fig. 23

(DISPLAY IMAGE SWITCHING PROCESS)

| PROCESSING | USER'S OPERATION | FIRST PIEZOELECTRIC ELEMENT | | SECOND PIEZOELECTRIC ELEMENT | | PROCESSING CONTENTS |
|---|---|---|---|---|---|---|
| | | PIEZO-ELECTRIC LAYER DEFORMATION | GENERATED VOLTAGE | PIEZO-ELECTRIC LAYER DEFORMATION | GENERATED VOLTAGE | |
| A | PULL DOWN | STRETCH | + | COMPRESS | − | START RECORDING OF DISPLAYED IMAGE |
| B | PULL UP | COMPRESS | − | STRETCH | + | CANCEL RECORDING OF DISPLAYED IMAGE |

PRINTER AND IMAGE OUTPUT APPARATUS

CROSS-REFERENCE TO RELATED APPLICATION

The present application claims priority from Japanese Patent Application No. 2007-202000, filed on Aug. 2, 2007, the disclosure of which is incorporated herein by reference in its entirety.

BACKGROUND OF THE INVENTION

1. Field of the Invention

The present invention relates to a printer which records an image on a recording medium and an image output apparatus which outputs an image to an external device.

2. Description of the Related Art

A printer which records an image on a recording medium such as printing paper generally includes; a display which is capable of displaying various pieces of information regarding image recording; and an operation panel used by users for operating the printer based on the information displayed on the display (see, for example, Japanese Patent Application Laid-open No. 2006-35662). Such a printer is generally capable of further displaying images of a plurality of input image data on the display. Users can switch an image displayed on the display by operating various kinds of buttons provided on the operation panel and can also select a desired image to be printed.

Further, as an apparatus outputting an image (image data) to a printer, a large-screen display device, and the like, there has been known an image output apparatus having the same structure as described above. Specifically, users can switch an image to be displayed on a display by operating various kinds of buttons provided on an operation panel and can select a desired image to be output.

However, users such as an elderly person not good at operating devices has difficulty in understanding functions of small buttons provided on an operation panel. Therefore, it is very difficult for users not good at operating devices to switch display image data among a plurality of image data by operating these buttons and to find desired image data. That is, a conventional printer did not offer easiness when users not good at operating devices tries to have desired image data, among the plurality of image data, displayed on a display.

SUMMARY OF THE INVENTION

It is an object of the present invention to provide a printer and an image output apparatus which are easily operated even by users not good at operating devices when they tries to have desired image data among a plurality of displayed image data.

According to a first aspect of the present invention, there is provided a printer which prints an image on a recording medium, the printer including: a body having an attachment surface;

a display which displays an image of image data selected from a plurality of image data which are sorted in order;

an image printing section which prints the image of the image data on the recording medium;

a plate-shaped operation section which is attached to the attachment surface and which is capable of being on a standby state while being placed in parallel to and on the attachment surface and is rotatable around a rotary shaft parallel to the attachment surface;

a rotation operation detecting mechanism which detects a rotation operation performed to the operation section; and a display image switching mechanism which switches the plurality of sorted image data to be displayed on the display section according to an order of the sorted image data, based on the rotation operation to the operation section detected by the rotation operation detecting mechanism.

On the attachment surface provided in the printer body, the plate-shaped operation unit (operation tab) is rotatably attached. When users perform the rotation operation (flipping operation) to the operation unit as if they were turning a page of a book, the rotation operation to the operation unit (rotation angle, rotation direction, rotation speed, and the like) is detected by the rotation operation detecting mechanism. Then, based on the detected rotation operation to the operation unit, the display image switching mechanism determines whether the user wants to forward-feed or backward-feed the image data to be image-displayed on the display, and switches the display image data according to the order of the plural image data.

As described above, since users can cause the printer to forward-feed/backward-feed the display image according to the rotation of the operation unit by rotating the plate-shaped operation unit as if they were tuning a page of a book, even users not good at operating devices can easily have a desired image to be selected displayed on the image display unit.

In the printer of the present invention, when the rotation operation detecting mechanism detects that the operation unit starts to be rotated from the standby state on the attachment surface, the display image switching mechanism may make the display to display an image of first image data among the plurality of sorted image data.

In this case, since the first image is displayed on the display only by rotating the operation unit from the standby state, even users not good at operating devices can easily cause the printer to start the image display. The plurality of image data can be sorted in arbitrary order. For example, the image data may be sorted based on the names of data files (for example, in alphabetical order) or preparation dates of the image data.

In the printer of the present invention, when the rotation operation detecting mechanism detects that the operation section is rotated at a speed lower than a predetermined speed, the display image switching mechanism may switch the image data to be displayed on the display to image data immediately before or immediately after image data currently displayed among the plurality of image data; and when the rotation operation detecting mechanism detects that the operation section is rotated at a speed not less than the predetermined speed, the display image switching mechanism may not switch the image data to be displayed on the display.

Generally, users see text, pictures, and so forth on a page along with the operation of turning a page of a book and therefore, the speed at which a page of a book is turned is often relatively slow. Therefore, when the rotation operation detecting mechanism detects that the operation unit is rotated at a slow speed lower than the predetermined speed, the display image switching mechanism switches the image data to be image-displayed on the display. Consequently, the user can switch the image to be displayed on the image display unit by operating the operation unit as if they were turning a page of a book.

On the other hand, the speed when users returns their hand in order to turn the next page after turning a page is generally higher than that when they turn a page. Therefore, it is thought that the rotation speed when the operation unit, after rotated in one predetermined direction as if a page were being turned, is once rotated to the original position in the other direction in order to continue the rotation in the one direction is generally higher than the speed of the rotation intended for the display image switching. Therefore, when the rotation operation detecting mechanism detects that the operation unit is rotated at a relatively high speed equal to or higher than the predetermined speed, the display image switching mechanism determines that this rotation operation is only for returning the operation unit. That is, the display image switching mechanism determines that this rotation operation does not mean a request for the forward/backward feed of the display image, and does not switch the image data to be displayed.

In the printer of the present invention, when the rotation operation detecting mechanism detects that the operation section is rotated in one rotation direction at the speed lower than the predetermined speed, the display image switching mechanism may make the display to display the image data immediately after the image data currently displayed; and when the rotation operation detecting mechanism detects that the operation unit is rotated in the other rotation direction at the speed lower than the predetermined speed, the display image switching mechanism may make the display to display the image data immediately before the image data currently displayed.

When the operation unit is rotated in one rotation direction at a slow speed lower than the predetermined speed, the display image switching mechanism switches the image data to be displayed on the display to the immediately subsequent data. On the other hand, when the operation unit is rotated in the other rotation direction at a slow speed lower than the predetermined speed, the display image switching mechanism switches the image data to be image-displayed on the image display unit to the immediately preceding data. That is, when the operation unit is rotated in one direction, the display image is forward-fed by one, and when the operation unit is rotated in the other direction, the display image is backward-fed by one, which makes it possible to switch the display image as if a page of a book were being turned.

The printer of the present invention may further include an image selecting mechanism selecting image data among the plurality of image data displayed on the display.

In this case, since the image selecting mechanism selects the image data image-displayed on the image display unit, it is possible to perform various kinds of processing (for example, recording to a recording medium, image processing, and the like) to the selected image data.

The printer of the present invention may further include a push-pull operation detecting mechanism which detects a push-pull operation in which the operation section which has been rotated from the state of being placed in parallel to and on the attachment surface is pulled in an away-direction along a plane direction of the operation section or is pushed in a toward-direction along the plane direction of the operation section, the away-direction being a direction away form the attachment surface, and the toward-direction being a direction toward the attachment surface, wherein the image selecting mechanism may determine whether or not to select the image data displayed on the display, based on a result of the detection of the push-pull operation detecting mechanism.

In this case, users can easily select the image data displayed on the display by rotating the operation unit to have a desired image displayed on the image display unit and thereafter operating (pulling, pushing, or the like) the operation unit in the direction away from/toward the attachment surface. That is, since it is not necessary to operate a part other than the operation unit when selecting desired image data from the plural image data, even users not good at operation devices can easily select an image.

In the printer of the present invention, the image selecting mechanism may select the image of the image data displayed on the display when the push-pull operation detecting mechanism detects that the operation section is pulled in the away-direction; and when the push-pull operation detecting mechanism then detects that the operation unit is pushed in the toward-direction, the image selecting mechanism may cancel the selection of the image data previously performed.

In this case, users can select the image data displayed on the display by pulling the operation unit in the direction away from the attachment surface as if they were pulling and tearing off a page of a book. Further, the user can cancel the previous image selection by pushing the operation unit toward the attachment surface as if they were pushing back the page once selected by pulling.

In the printer of the present invention, when the push-pull operation detecting mechanism detects that one end of the operation section along the rotary shaft is pulled in the away-direction, the image selecting mechanism may select the image data displayed on the display; and when the push-pull operation detecting mechanism then detects that the other end of the operation section along the rotary shaft is pulled in the away-direction, the image selecting mechanism may cancel the selection of the image data previously performed.

In this case, users can select the image data displayed on the display by pulling the one end, in the rotary shaft direction, of the operation unit. Further, users can cancel the previous image selection by pulling the other end, in the rotary shaft direction, of the operation unit.

In the printer of the present invention, when the image data displayed on the display has been selected, the image selecting mechanism may make the image printing section to print the image of the image data on the recording medium.

In this case, by operating the operation unit, users can switch the image to be displayed on the display to select a desired image and can further cause the image printing unit to print the selected image on the recording medium.

In the printer of the present invention, when the push-pull operation detecting mechanism detects that the operation section is pulled in the away-direction, the image selecting mechanism may increase a number of copies of the recording medium on which the image of the image data is to be printed by the image printing section; and when the push-pull operation detecting mechanism detects that the operation unit is pushed in the toward-direction, the image selecting mechanism may decrease the number of copies of the recording medium on which the image of the image data is to be recorded by the image printing section.

In this case, users can increase the number of recording copies of the displayed image to be printed by the image printing unit, by pulling the operation unit in the direction away from the attachment surface as if they were pulling and tearing off a page of a book. Further, by pushing the operation unit toward the attachment surface as if they were pushing back the page once pulled, the user can decrease the number of recording copies.

In the printer of the present invention, when the push-pull operation detecting mechanism detects that one end of the operation unit along the rotary shaft is pulled in the away-direction, the image selecting mechanism may increase a number of copies of the recording medium on which the image of the image data is to be printed by the image printing section; and when the push-pull operation detecting mechanism detects that the other end of the operation unit along the rotary shaft is pulled in the away-direction, the image selecting mechanism may decrease the number of copies of the recording medium on which the image of the image data is to be printed by the image printing section.

In this case, users can increase the number of recording copies of the displayed image to be printed by the image printing section, by pulling the one end, in the rotary shaft direction, of the operation unit. Further, the user can decrease the number recording copies by pulling the other end, in the rotary shaft direction, of the operation unit.

In the printer of the present invention, the image selecting mechanism may change an increment amount or a decrement amount of the number of copies of the recording medium according to a degree of the push-pull operation to the operation section detected by the push-pull operation detecting mechanism, In this case, the increment/decrement amount of the number of recording copies changes according to the degree of an amount by which the operation unit is moved by the push-pull operation. Therefore, users can increase/decrease the number of recording copies by a large number at a time by, for example, pulling or pushing the operation unit with a strong force. Conversely, by pulling or pushing the operation unit with a weak force, users can increase/decrease the number of recording copies in small increments/decrements.

In the printer of the present invention, the push-pull operation detecting mechanism may include two sensors which independently detect the push-pull operations to both ends of the operation section along the rotary shaft.

Providing the two sensors (push-pull operation detecting mechanisms) detecting the push-pull operations to the both ends, in the rotary shaft direction, of the operation unit makes it possible to detect various operations to the operation unit. Specifically, pulling of the both ends of the operation unit, pushing of the both ends, pulling of only one of the both ends, or pushing of only one of the both ends can be discriminatingly detected. Since these operations to the operation unit can be discriminatingly detected, it is possible to assign different kinds of processing (for example, image recording, cancellation of recording, increase/decrease in the number of recording copies, image processing such as change in rotation or density) to these operations. That is, simply operating the operation unit can cause various kinds of processing to be performed to one image data image-displayed on the image display unit.

In the printer of the present invention, when one of the two sensors detects that one end of the operation section along the rotary shaft is pulled in the away-direction and at the same time, the other of the two sensors detects that the other end of the operation section along the rotary shaft is pushed in the toward-direction, the display may rotate the image currently displayed.

When the operation unit in a state where it has been rotated from a standby position is operated to rotate in its plane, the one end, in the rotary shaft direction, of the operation unit is pulled in the direction away from the attachment surface and at the same time the other end, in the rotary shaft direction, of the operation unit is pushed toward the attachment surface. Therefore, providing the two sensors (push-pull operation detecting mechanisms) make it is possible to detect the in-plane rotation of the operation unit. Further, when the two sensors detect the in-plane rotation of the operation unit, the display rotates the image currently displayed. Consequently, users can easily rotate the image currently displayed on the display, only by rotating the operation unit in its plane.

The printer of the present invention may further include a transport mechanism which transports, in a predetermined transport direction, the recording medium on which the image has been recorded by the image printing section, wherein when the push-pull operation detecting mechanism detects that the operation section is pulled along the transport direction, the image selecting mechanism may select the image data displayed on the display, and the image printing section may record the image of the selected image data on the recording medium.

In this case, when users selects the image data displayed on the display by pulling the operation unit, the recording medium on which the image has been printed is discharged in the direction in which the operation unit is pulled. That is, when the user wants to record the displayed image, they only have to pull the operation unit in which the recording medium is discharged, and therefore, even users not good at operating devices can easily learn how to operate the operation unit for the printing of the image on the recording medium.

In the printer of the present invention, the display may be substantially flush with the operation section which is in the standby state on the attachment surface.

In this case, since users can operate the operation unit while seeing the image display unit, the user can easily find a desired image while switching the display image, In the printer of the present invention, the display may be positioned opposite the rotary shaft with respect to the operation section when the operation section is in the standby state.

In this case, the operation unit is opened around the rotary shaft from the standby state in which it is placed on the attachment surface, in the direction opposite the display. Therefore, a feeling that users have when seeing the image display unit while rotating the operation unit to the opposite side of the image display unit is close to a feeling that the users have when seeing the next page opposite a turned page of a book when turning the page. Therefore, the operation for the image switching is performed with a feeling further close to the feeling that the users have when turning a page of a book.

In the printer of the present invention, when the operation section is in the standby state on the attachment surface, the display image switching mechanism may make the display to display an image of a closed book; and when the rotation operation detecting mechanism detects the rotation operation to the operation unit, the display image switching mechanism may synthesize image data of the book in an opened state and the predetermined image data corresponding to the rotation operation to the operation section, and may make the display to display a resultant synthesis image.

When the operation unit is in the standby state, the image of the closed book is displayed on the image display unit. Then, when users rotate the operation unit, the display image switching mechanism synthesizes the image data of the book in the opened state and the image data corresponding to the rotation operation to the operation unit and causes the image display unit to display the synthesis image in which the image of the image data is inserted in the opened book. Consequently, when rotating the operation unit, the users can feel as if they were turning a page of the book. In the printer of the present invention, a direction in which the book displayed on the display is opened from the closed state may be same as a rotation direction in which the operation section is rotated from the standby state on the attachment surface.

In this case, since the rotation direction in which the operation unit is rotated from the standby state matches the direction in which the virtual book displayed on the display is opened, users can easily recognize in which rotation direction the operation unit should be rotated in order to forward-feed the image as if turning a page of the book.

In the printer of the present invention, a color of a surface, of the operation section in the standby state, facing the attachment surface may be white; and a color of the attachment surface may be other than white.

In this case, when the operation unit is rotated for the image switching, the white facing surface (rear surface) of the operation unit appears to the front and the color of the attachment surface is color other than white, and therefore, the white color of the rear surface of the operation unit stands out. Therefore, when rotating the operation unit, users can feel as if a page of white paper were appearing when turning a page of a book.

In the printer of the present invention, based on rotation angle information of the operation section detected by the rotation operation detecting mechanism, the display image switching mechanism may synthesize image data displayed before and after the switching of the image data to generate synthesis image data showing that the switching is underway and causes the display to display an image of the synthesis image data.

In this case, the image data displayed before and after the switching are synthesized according to the rotation angle of the operation unit and the synthesis image showing that the switching is underway is displayed. Therefore, users can feel that the display image is switched in linkage with the rotation of the operation unit. Further, only by rotating the operation unit in one direction a little, the user can check an image to which the display image is switched according to the rotation direction of the operation unit. This can allow the user to easily recognize in which rotation direction the operation unit should be rotated in order to forward-feed the image (backward-feed the image).

The printer of the present invention may further include a data group selecting mechanism which selects an image data group to be displayed on the display section, among a plurality of image data groups each including the plurality of image data, wherein when the rotation operation detecting mechanism detects the rotation operation to the operation section after the data group selecting mechanism selects one of the image data groups, the display image switching mechanism may make the display to display images of the plurality of image data belonging to the selected image data group.

In this case, when there exist the image data groups each including the plural image data arranged in order, the data group selecting mechanism can select the image data group to be displayed on the display.

According to a second aspect of the present invention, there is provided an image output apparatus which outputs an image, the apparatus including:

a body having a predetermined attachment surface;

a display which displays an image of image data selected from a plurality of image data sorted in order;

an output section which outputs the image data;

a plate-shaped operation section which is attached to the attachment surface and which is capable of being on a standby state while being placed in parallel to and on the attachment surface and is rotatable around a rotary shaft parallel to the attachment surface;

a rotation operation detecting mechanism which detects a rotation operation performed to the operation section; and a display image switching mechanism which switches the plurality of sorted image data to be displayed on the display according to an order of the sorted image data, based on the rotation operation to the operation section detected by the rotation operation detecting mechanism.

According to the second aspect of the present invention, on the attachment surface provided in the apparatus body, the plate-shaped operation unit is rotatably attached. When users perform the rotation operation to the operation unit as if they were turning a page of a book, the rotation operation to the operation unit (rotation angle, rotation direction, rotation speed, and the like) is detected by the rotation operation detecting mechanism. Then, based on the detected rotation operation to the operation unit, the display image switching mechanism determines whether the users want to select or backward-feed the image data to be image-displayed on the image display unit, and switches display image data according to the order of the plural image data. As described above, since users can cause the printer to forward-feed/backward-feed the display image according to the rotation of the operation unit by rotating the plate-shaped operation unit as if they were turning a page of a book, even users not good at operating devices can easily cause the image display unit to display a desired image to be selected.

According to a third aspect of the present invention, there is provided an image output apparatus which outputs an image or image data, the apparatus including:

a body having a predetermined attachment surface;

a display which displays an image of image data selected from a plurality of image data sorted in order;

a plate-shaped operation tab which is attached to the attachment surface of the body, which is capable of being on a standby state while being placed in parallel to and on the attachment surface and is rotatable around a rotary shaft parallel to the attachment surface, and via a predetermined book-like operation is applicable;

a detection section which detects the book-like operation to the operation unit; and an image processing section which performs predetermined processing to the image data of the image displayed on the display, based on the book-like operation detected by the detection section.

According to the third aspect of the present invention, users can cause the predetermined processing (for example, the forward feed/backward feed and the like of the display image according to the rotation of the operation unit) to be performed to the image displayed on the image display unit, by performing the book-like operation such as an operation of rotating the plate-shaped operation unit as if, for example, they were turning a page of a book. By thus performing the book-like operation which is an operation imitating an operation to a book, it is possible to cause the predetermined image processing to be performed, and therefore, even users not good at operating devices can easily cause the display to display a desired image that they want to select. Here, the book-like operation refers to various kinds of operations to a book such as an operation of turning a page of a book, an operation of tearing off a page of a book, an operation of returning a torn page, an operation of folding a corner of a page, and an operation of rotating a book.

In the image output apparatus of the present invention, the book-like operation may include a rotation operation of rotating the operation section around the rotary shaft; the detection section may include a rotation operation detecting mechanism which detects the rotation operation to the operation unit; and the image processing section may include a display image switching mechanism which switches the plurality of sorted image data to be displayed on the display section according to an order of the sorted image data, based on the rotation operation to the operation section detected by the rotation operation detecting mechanism. Further, the image output apparatus of the present invention may be a printer which prints an image on a recording medium, and may include a printing section which prints the image of the image data on the recording medium.

BRIEF DESCRIPTION OF THE DRAWINGS

FIG. 4 is a table showing the processing contents of a display image switching process;

FIG. 5 is a table showing the processing contents of an image selection process;

FIG. 6 is a table showing the processing contents of a display image switching process of a modified form 1;

FIG. 12 is a table showing the processing contents of an image folder selection process of the modified form 5;

FIG. 16 is a table showing the processing contents of an image selection process of the second embodiment;

FIG. 22 is a table showing the processing contents of a display image switching process of the fourth embodiment;

FIG. 23 is a table showing the processing contents of an image selection process of the fourth embodiment;

DETAILED DESCRIPTION OF THE PREFERRED EMBODIMENTS

First Embodiment

Figure 1:
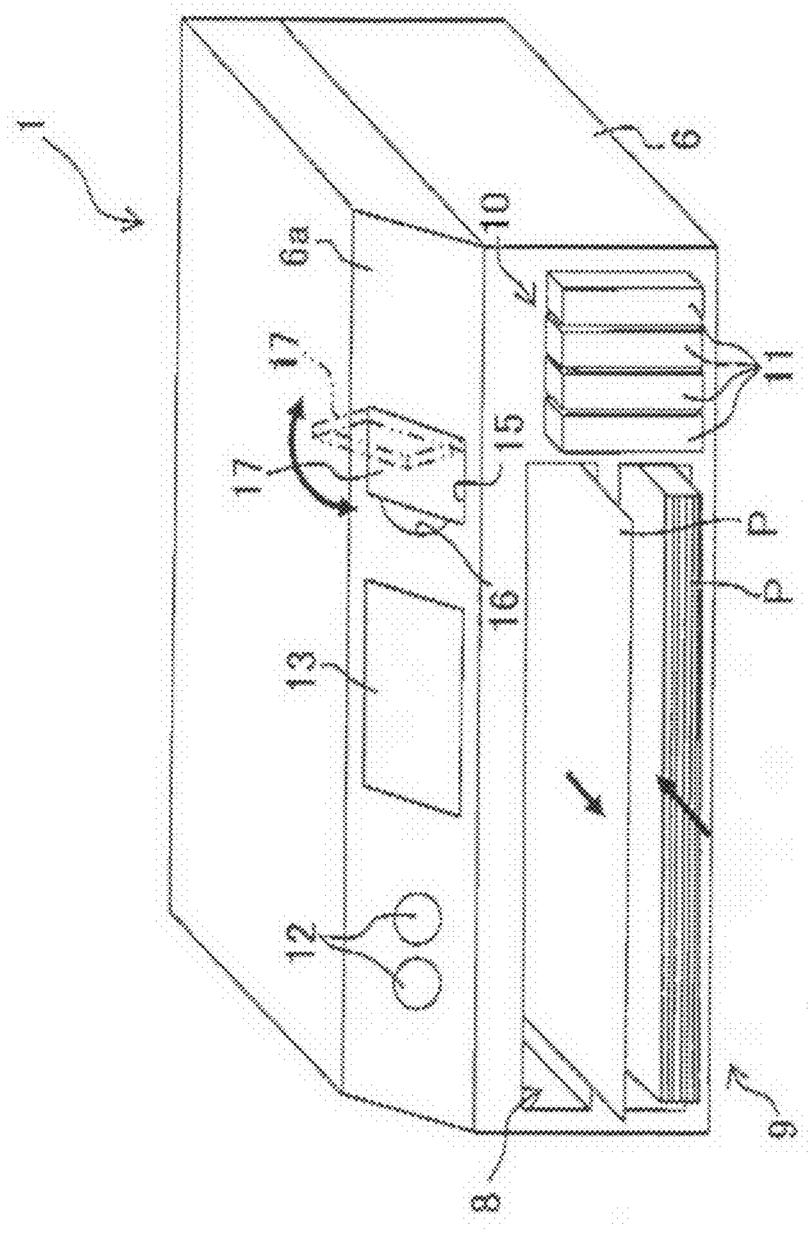
FIG. 1 is an external perspective view of a printer according to a first embodiment of the present invention.

Next, a first embodiment of the present invention will be explained. FIG. 1 is a perspective view of a printer of the first embodiment, and FIG. 2 is a block diagram schematically showing the electrical configuration of the printer.

Figure 2:
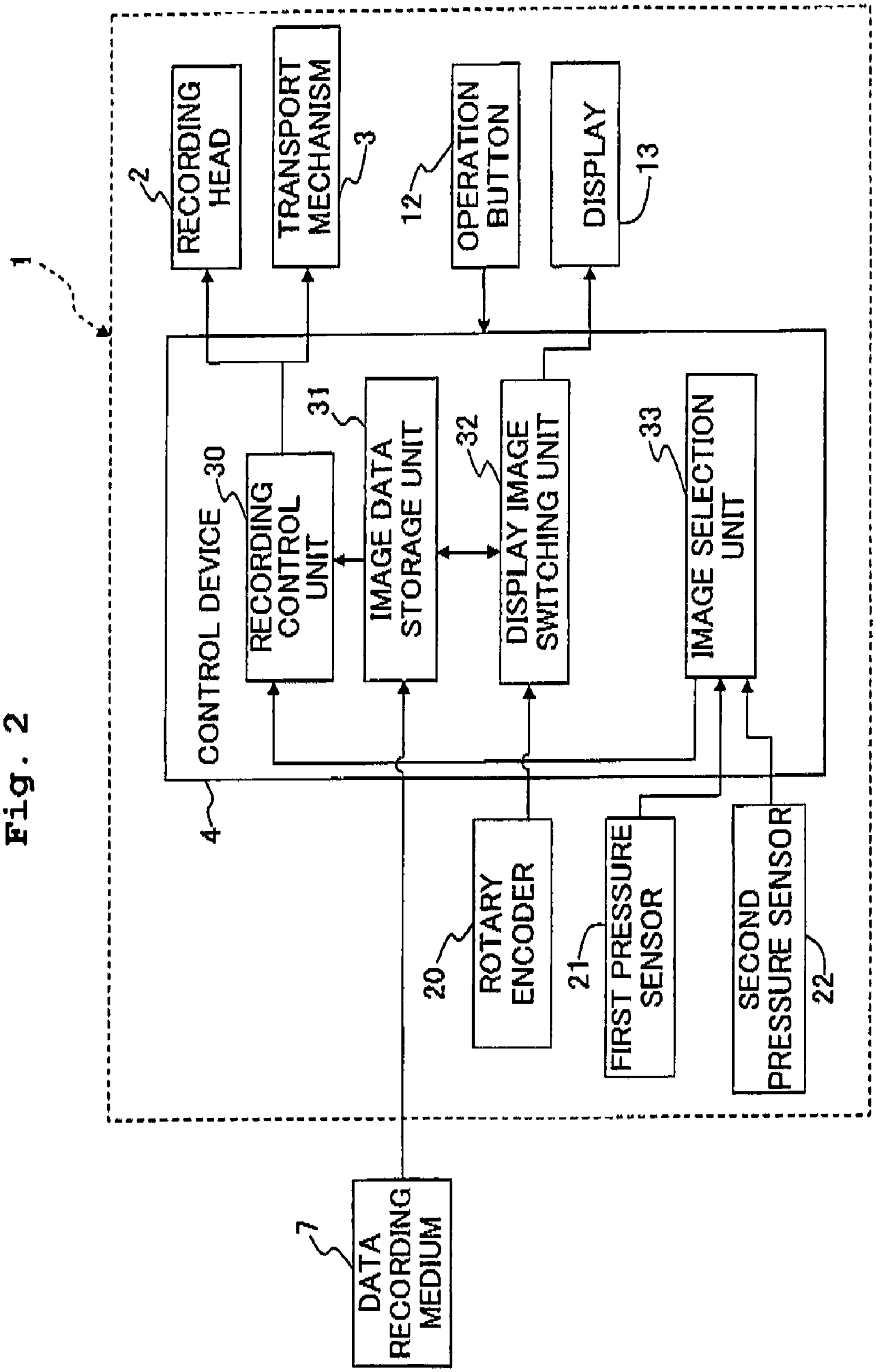
FIG. 2 is a block diagram schematically showing the electrical configuration of the printer of the first embodiment.

As shown in FIGS. 1 and 2, the printer 1 of the first embodiment includes: a recording head 2 (image printing section) recording an image on printing paper P (recording medium); a carrier mechanism 3 carrying the printing paper P in a predetermined direction (front side in FIG. 1); and a control device 4 controlling various mechanisms of the printer 1, including the recording head 2 and the carrier mechanism 3.

As shown in FIG. 1, the printer 1 has a printer main body 6 in a substantially box shape, in which the recording head 2, the transporting mechanism 3, and so on are housed. As the recording head 2, used is one performing printing on the printing paper P by a known method such as ink-jet printing, laser printing, or heat transfer printing. When a data recording medium 7 (see FIG. 2) in which image data are recorded is connected to the printer 1, the recording head 2 records an image of image data (image file) input from the data recording medium 7 on the printing paper P based on a command from the control device 4. Note that, in the explanation below, one image data (image file) refers to a set of data forming one sheet image.

A front side of a lower half portion of the printer main body 6 is partly open, and in this open portion, a paper feed try 9 on which the printing paper P is put and a paper discharge tray 8 to which the printing paper P having an image recorded thereon is discharged are provided. The transporting mechanism 3 transports the printing paper P put on the paper feed tray 9 to the recording head 2 in the printer main body 6 by a carrier roller driven by a motor, and discharges the printing paper P on which an image has been recorded by the recording head 2, to the paper discharge tray 8 provided in front thereof.

On the front surface of the lower half portion of the printer main body 6, a cartridge loading part 10 is provided on a side of the paper feed tray 9 and the paper discharge tray 8. Four ink cartridges 11 containing four color inks (yellow, magenta, cyan, and black) respectively are detachably loaded in the cartridge loading part (cartridge installing portion) 10.

In an upper half portion of the printer main body 6, an attachment surface (mounting surface) **6*a* inclining forward is formed. On the attachment surface 6*a*, provided are a plurality of operation buttons 12 operated by users and a display 13 (image display unit) displaying information such as an operation state of the printer 1 and an error message and displaying an image of input image data. Therefore, users can easily operate the operation buttons 12 and so on provided on the attachment surface 6*a* from the near side in FIG. 1**.

Further, as shown in FIG. 1, the attachment surface **6*a* has a recess 15 in a rectangular shape in a plane view at a position on the right of the display 13 which is disposed at the substantially center. In the recess 15, an operation tab (operation knob) 17 (operation section) in a rectangular plate shape slightly smaller than the recess 15 is housed. Further, the operation tab 17 is rotatably attached to the attachment surface 6*a***.

Figure 3:
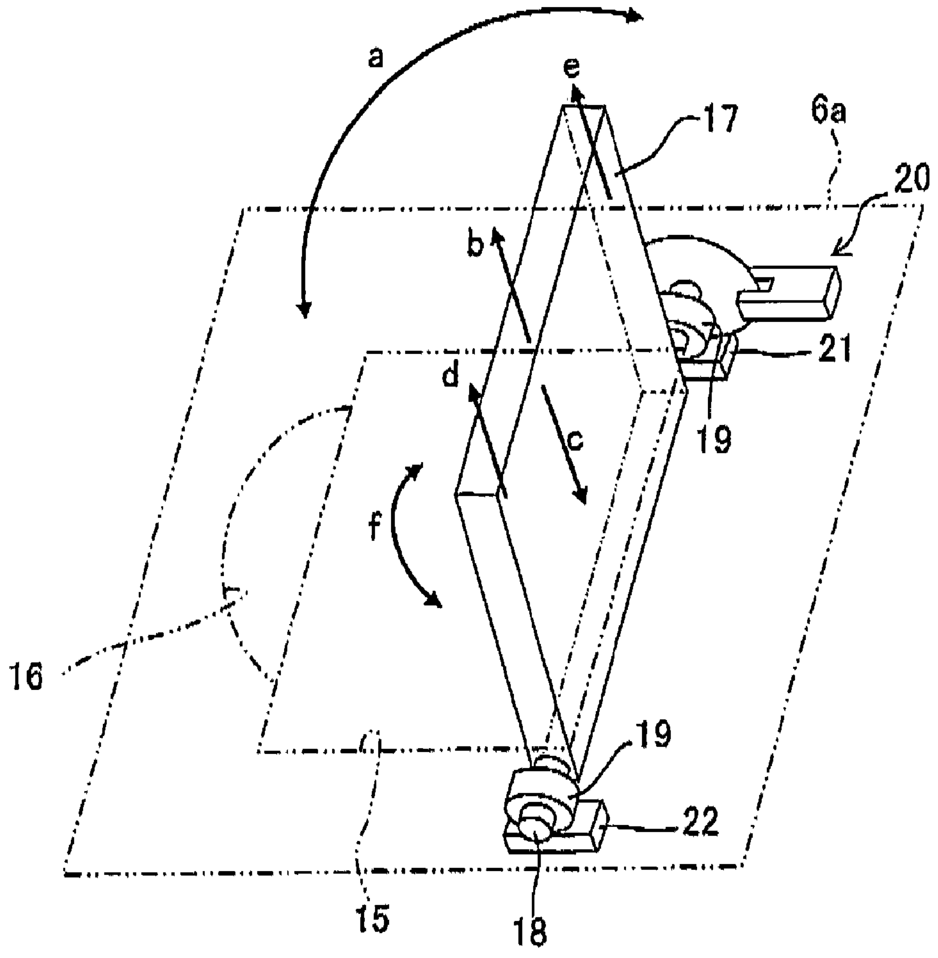
FIG. 3 is a perspective view of an operation tab of the first embodiment.

FIG. 3 is a perspective view of the operation tab 17. As shown in FIG. 3, a rotary shaft 18 extending along a longer side of the operation tab 17 is fixed to a side portion, of the operation tab 17, in the width direction. Both ends of the rotary shaft 18 are rotatably supported by bearings 19. Therefore, the operation tab 17 is rotatable about the rotary shaft 18, with respect to the attachment surface 6*a*.

The operation tab 17 can take a standby state, in which the operation tab 17 is housed in the recess 15 and thus is placed on the attachment surface 6*a* (a bottom surface of the recess 15) (as shown by the solid line in FIG. 1). The operation tab 17 can also take a rotating state where the operating tab 17 has rotated from the standby state about the rotary shaft 18 (as shown by the two-dot chain line in FIG. 1, the state in FIG. 3). When the operation tab 17 is in the standby state, an upper surface of the operation tab 17 housed in the recess 15 and an upper surface of the attachment surface 6*a* around the recess 15 are substantially flush with each other. Along a left edge of the recess 15, a dent 16 is formed so that users can easily pull out the operation tab 17 housed in the recess 15. Further, the display 13 is substantially flush with the operation tab 17 in the standby state, and is positioned opposite (on the left of) the rotary shaft 18 across the operation tab 17 in the standby state. That is, across the operation tab 17, the display 13 is positioned opposite a side toward which the operation tab 17 rotates from the standby state.

As shown in FIG. 3, a rotary encoder 20 (rotation operation detecting mechanism), which detects a rotation operation to the operation tab 17 (rotation direction, rotation angle, rotation speed, and so on), is attached to an upper end of the rotary shaft 18. Two pressure sensors (a first pressure sensor 21 and a second pressure sensor 22) are provided between the attachment surface 6*a* and the bearings 19, which rotatably support the upper end and the lower end of the rotary shaft 18, respectively. Further, the rotary shaft 18 is biased toward the attachment surface 6*a* by a biasing mechanism (not shown) such as a spring coil. Since the two bearings 19 attached to the rotary shaft 18 are pressed toward the two pressure sensors 21, 22, the two bearings 19 and the two pressure sensors 21, 22 are constantly in contact with each other.

The pressure sensors 21, 22 have elements of which internal electric resistance values change according to changes in pressing forces acting from the bearings 19, and output electric signals according to the pressing forces acting on the elements. For example, when users pulls the operation tab 17 away from the attachment surface 6*a* or pushes the operation tab 17 toward the attachment surface 6*a*, vertical-direction both ends (both ends along the rotary shaft direction) of the operation tab 17 move in a plane direction of the operation tab 17. In such a case, the two pressure sensors 21, 22 detect the changes in the pressing forces which act thereon via the bearings 19. That is, the two pressure sensors 21, 22 correspond to a push-pull operation detecting mechanism which detects an operation of pulling, the both ends of the operation tab 17 in the rotary shaft direction, in a direction away from the attachment surface 6*a* and/or an operation of pushing the both ends toward the attachment surface (hereinafter, called a push-pull operation).

In the printer 1 of the first embodiment, when users rotates the plate-shaped operation tab 17 as if they were turning a page of a book, the rotation of the operation tab 17 is detected by the rotary encoder 20. Such an operation to rotate the operation tab 17 as if turning a page of a book (turning operation, flipping operation) corresponds to a book-like operation. According to the rotation of the operation tab 17, an image to be displayed on the display 13 is switched (display image switching process). Further, when users pulls the plate-shaped operation tab 17 in an away-direction away from the attachment surface 6*a* or pushes the operation tab 17 in a toward-direction toward the attachment surface 6*a*, the two pressure sensors 21, 22 detect the push-pull operation to the operation tab 17 to/from the attachment surface 6*a*. Then, according to the push-pull operation to the operation tab 17, image data displayed on the display 13 is selected, and various kinds of processing such as recording on the printing paper P are performed to the selected image data (image selection process). The concrete contents of the display image switching process and the image selection process which are performed when the operation tab 17 is operated will be described in detail in the next explanation of the control device 4.

Next, the electrical configuration of the printer 1, mainly the control device 4, will be explained in detail with reference to the block diagram in FIG. 2. The control device 4 includes a central processing unit (CPU), a read only memory (ROM) storing programs, data, and the like for controlling various mechanisms of the printer 1, a random access memory (RAM) temporarily storing data processed by the CPU, an input/output interface via which signals are input/output from/to an external apparatus, a recording control unit 30, and an image data storage unit 31 storing image data input from the data recording medium 7.

In the data recording medium 7, a plurality of image data which are previously sorted in order based on a certain predetermined condition such as the names of data files (for example, in alphabetical order) and preparation dates of the image data are recorded. The image data are classified into image folders (image data groups). The image data read from the data recording medium 7 when the data recording medium 7 is connected to the printer 1 are stored in the image data storage unit 31.

Storage devices such as a USB memory and a memory card, which are connected when inserted in a slot or the like of the printer, or an external storage device which is wire-connected by a cable or the like or is wirelessly connected correspond to the data recording medium 7 storing the image data.

The recording control unit 30 controls the recording head 2 and the carrier mechanism 3 by referring to the data stored in the image data storage unit 31 so that an image of image data selected by users is printed on the printing paper P. Further, the control device 4 causes the display 13 to display a state of the printer 1 (a state where image recording is underway, a standby state, or the like), an error message, and so on, thereby notifying these pieces information to the user.

The control device 4 further has: a function of switching image data to be image-displayed on the display 13, according to the order of the plural image data based on a users operation to the operation tab 17; and a function of selecting image data image-displayed on the display 13, based on a user's operation to the operation tab 17.

Specifically, the control device 4 has: a display image switching unit 32 (display image switching mechanism) which, in response to a user's operation to the operation tab 17, switches image data to be image-displayed on the display 13 based on the rotation operation to the operation tab 17 detected by the rotary encoder 20; and an image selection unit 33 (image selecting mechanism) which selects image data image-displayed on the display 13, based on the push-pull operation to the operation tab 17 detected by the first and second pressure sensors 21, 22.

The recording control unit 30, the image data storage unit 3*l*, the display image switching unit 32, and the image selection unit 33 are realized by the CPU, the ROM, the RAM, and so on included in the control device 4. In other words, various programs such as a program for switching a display image of the display 13 and a program for selecting an image displayed on the display 13 are stored in the ROM of the control device 4, and the CPU of the control device 4 realizes the functions of the recording control unit 30, the image data storage unit 31, the display image switching unit 32, and the image selection unit 33 by executing the programs stored in the ROM.

Display Image Switching Process

First, the display image switching process by the display image switching unit 32 will be explained with reference to FIG. 3 and the process explanatory table in FIG. 4. When users rotate the operation tab 17 right or left about the rotary shaft 18 as shown by the arrow a in FIG. 3, the display image switching unit 32 switches image data to be displayed on the display 13 according to the predetermined order of the plural image data.

When the data recording medium 7 is connected to the control device 4 of the printer 1 and the rotary encoder 20 detects that the operation tab 17 is at the standby position, that is, the operation tab 17 is placed on the attachment surface 6*a* (standby state), the display image switching unit 32 causes the image data storage unit 31 to store the plural image data recorded in the data recording medium 7 and causes the display 13 to display the image folder name where these image data are stored. At this time, if identification information such as the preparation dates and preparer's names of the image data are appended to the image folder, these pieces of information may also be displayed on the display 13 so that the users can easily recognize the kind of the image folder.

When there are a plurality of image folders (image data groups) in the data recording medium 7 and each of the image folders contains a plurality of image data, a name list of these image folders and a message or the like promoting the selection may be displayed on the display 13. In this case, the users can select an image folder containing an image to be displayed on the display 13. Then, when the users select one of the image folders by operating the operation button 12 or the like when the operation tab 17 is in the standby state, the name of this image folder is displayed on the display 13. In this case, the operation button 12 corresponds to a data group selecting mechanism of the invention of the present application.

Next, when the users rotate the operation tab 17 right from the standby state around the rotary shaft 18, this right rotation operation is detected by the rotary encoder 20. Then, the display image switching unit 32 causes the display 13 to display an image of the first image data among the plural image data stored in the image data storage unit 31. In this manner, only by the user's rotation operation to the operation tab 17 which is in the standby state, the first image is displayed on the display 13. Therefore, even users not good at operating devices can easily make the printer 1 start the image display. Such an operation of rotating the operation tab 17 in the standby state corresponds to an operation of opening a closed book. Such a rotation operation also corresponds to the book-like operation.

Further, when the users rotate the operation tab 17 right as if they were turning a page of a book while the image is displayed on the display 13, the display image switching unit 32 causes the display 13 to display image data immediately after the currently displayed image data. Conversely, when the users rotate the operation tab 17 left as if they were returning the page of a book, the display image switching unit 32 causes the display 13 to display image data immediately before the currently displayed image. Therefore, by rotating the plate-shaped operation tab 17 as if turning a page of a book, the users can cause the switching (forward feed/backward feed) of an image displayed on the display 13. Such an operation of rotating the operation tab 17 as if turning a page of a book also corresponds to the book-like operation.

When the users want to successively forward-feed (backward-feed) an image displayed on the display 13 by rotating the operation tab 17, the users first rotate the operation tab 17 in one direction to have an image displayed, and thereafter rotate the operation tab 17 again in the one direction. In order to further switch to the next image, it is necessary to once return the operation tab 17 in the other direction. That is, for the forward feed (or the backward feed) of the image data, an operation of once returning the operation tab 17 in the reverse direction is necessary. The display image switching unit 32 needs to recognize that the operation of returning the operation tab 17 in the reverse direction is simply a preparatory operation for the next rotation operation and not an operation intended for the switching of the image data.

Here, when turning a page of a book, a person turning the page generally sees text, pictures, and so forth on the page at the same time, and therefore, the speed for turning a page is often relatively low. Therefore, in this embodiment, when the rotary encoder 20 detects that the operation tab 17 is rotated right or left at a slow speed lower than a predetermined speed, the display image switching unit 32 determines that this is a use's request for image forward/backward feed, and switches image data to be image-displayed on the display 13. Consequently, the users can switch the image to be displayed on the display 13 as if they were turning a page of a book.

The speed at which the users move their hand to the original position in order to turn the next page after turning a page is generally higher than the speed at which a page is turned. Therefore, as for the rotation speed at which the users rotate the operation tab 17 in one direction as if they were turning a page in order to switch the display image and the rotation speed at which the users thereafter rotate and once return the operation tab 17, it is thought that the latter is higher. Therefore, when the rotary encoder 20 detects that the operation tab 17 is rotated at a relatively high speed equal to the predetermined speed or higher, the switching of the image data to be image-displayed is not performed. That is, the display image switching unit 32 determines that the operation tab 17 is simply returned as the preparatory operation for the image switching and this rotation operation does not mean a user's request for the display image forward/backward feed.

The display image switching process described above is summarized in FIG. 4. When the operation tab 17 is at the standby position, the image folder name is displayed on the display 13 (processing A). Further, when the operation tab 17 is rotated from the standby position, an image of the first image data among the plural image data is displayed on the display 13. When the operation tab 17 is thereafter rotated right at a slow speed lower than the predetermined speed (rotation speed: low), an image to be displayed on the display 13 is switched to an image of immediately subsequent image data (processing B). On the other hand, when the operation tab 17 is rotated left at a slow speed lower than the predetermined speed (rotation speed: low), an image to be displayed on the display 13 is switched to an image of immediately preceding image data (processing C). However, when the operation tab 17 is rotated right or left at a speed equal to the predetermined speed or higher (rotation speed: high) during this image switching operation, this operation is determined as an operation for once returning the operation tab 17 (preparatory operation) and the display image of the display 13 is not switched (processing D, processing E).

As is seen from the above processing contents, by alternately rotating the operation tab 17 right and left at a slow speed lower than the predetermined speed, users can have images of two subsequent and preceding image data alternately displayed on the display 13.

Further, as shown in FIG. 1, the display 13 is substantially flush with the operation tab 17 which is placed on the attachment surface 6*a* (standby state). Therefore, when switching the display image by operating the operation tab 17, the users can see the display 13 at the same time, so that the users can easily find a desired image.

Further, as shown in FIG. 1, when the operation tab 17 is in the standby state, the rotary shaft 18 is positioned on the right side of the operation tab 17 and the display 13 is positioned on the left side of the operation tab 17 (opposite the rotary shaft 18). That is, the display 13 is positioned on the side of the operation tab 17 opposite the direction in which the operation tab 17 rotates from the standby state. That is, when the operation tab 17 in the standby state is rotated right, the display 13 displaying an image is positioned on the left of the operation tab 17 rotated right. Therefore, when the users see the display 13 while rotating the operation tab 17 in the direction opposite the display 13, they can have substantially the same feeling as when, at the time of turning a page of a book, they see the next page which is opposite the page the users have turned. Therefore, a feeling of operation that the users have when switching the image is further close to a feeling that they have when turning a page of a book.

Preferably, a surface, of the operation tab 17, which faces the attachment surface 6*a* when the operation tab 17 is in the standby state is white, and the attachment surface 6*a* of the printer body 6 has color other than white. In this case, when the operation tab 17 is turned right as if a page of a book were turned, the white facing surface (rear surface) of the operation tab 17 appears to the front and the attachment surface 6*a* has color other than white, which makes the white color of the rear surface of the operation tab 17 stand out. Therefore, when rotating the operation tab 17, the users feel as if they were turning a page of a book and then a page of white paper were appearing to the front.

Incidentally, the color of the attachment surface 6*a* is preferably low-brightness color such as black or dark blue so that the white color of the rear surface of the operation tab 17 more stands out. Further, the attachment surface 6*a* may be colored such that a bottom of the recess 15 is white and its portion except the bottom surface of the recess 15 has color other than white. In this case, since the rear surface of the operation tab 17 and the bottom surface of the recess 15 which appear when the operation tab 17 is rotated are white, the user can have a strong impression as if a white page were appearing by turning a page of a book.

Image Selection Process

Next, the image selection process by the image selection unit 33 will be explained with reference to FIG. 3 and the process explanatory table in FIG. 5. Based on the detection results of the two pressure sensors 21, 22 detecting the push-pull operation to the operation tab 17, the image selection unit 33 decides whether to select image data currently image-displayed on the display 13, and further performs various kinds of processing to the selected image data.

As shown in FIG. 5, the two pressure sensors 21, 22 can detect a plurality of kinds of user's operations such as a pulling operation from the attachment surface 6*a* (processing A in FIG. 5), a pushing operation toward the attachment surface 6*a* (processing B), a diagonally downward pulling operation (processing C, processing D), a diagonally upward pulling operation (processing E, processing F), and a rotation operation in the plane of the operation tab 17 (processing G, processing H). A plurality of kinds of processing to be explained below are assigned to these operations respectively. As will be described later, these operations imitate various operations to a book (tearing off, inserting, rotating, and so on of a page of a book), and all of these operations correspond to the book-like operation.

Processing for Image Recording

Processing A, Processing B

When users pulls the operation tab 17 away from the attachment surface 6*a* in a direction perpendicular to the rotary shaft 18 as shown by the arrow b in FIG. 3, the image selection unit 33 selects image data currently displayed on the display 13. The selected image is printed on the recording paper P by the recording head 2. When the users pushes the operation tab 17 toward the attachment surface 6*a* as shown by the arrow c in FIG. 3 after this image selection (image recording), the image selection unit 33 cancels the selection of the image data currently displayed on the display 13. Consequently, the image recording is stopped.

When the users pull the operation tab 17, which is at a position a certain rotation angle away from the standby position, in a direction in which the operation tab 17 is moved away from the attachment surface 6*a* (the arrow b direction), the pressing forces reduce (shown as "−" in FIG. 5) both in the first pressure sensor 21 provided at the upper end of the rotary shaft 18 of the operation tab 17 and the second pressure sensor 22 provided at the lower end of the rotary shaft 18. At this time, electric resistance values both in the first and second pressure sensors 21, 22 increase. Since signals indicating the reduction in the pressing forces are input to the image selection unit 33 both from the first and second pressure sensors 21, 22, the image selection unit 33 can recognize that the operation tab 17 is pulled in the direction perpendicular to the rotary shaft 18. At this time, the image selection unit 33 selects image data currently displayed on the display 13 to send a signal instructing the start of the recording of this image to the recording control unit 30 (processing A). Then, the recording control unit 30 controls the recording head 2 and the transport mechanism 3 so that the displayed image of the image data is recorded on the printing paper P.

Further, the users can push the operation tab 17 toward the attachment surface 6*a* in the direction perpendicular to the rotary shaft 18 before the completion of the recording of the image on the printing paper P after the instruction for recording start of the display image is given in the above-described manner. At this time, the electric resistance values reduce both in the first pressure sensor 21 and the second pressure sensor 22, so that an increase in the pressing forces (shown by + in FIG. 5) is detected. Then, the image selection unit 33 recognizes that the operation tab 17 is pushed toward the attachment surface 6*a*. Then, the image selection unit 33 sends the recording control unit 30 a signal instructing the cancellation of the image recording (processing B). In response to this instruction, the recording control unit 30 stops the recording of the image on the printing paper P.

In short, the users can select the image data image-displayed on the display 13 to have the image recorded on the printing paper P, by pulling the operation tab 17 in the direction away from the attachment surface 6*a* as if they were turning a page of a book to select a predetermined page and thereafter pulling and tearing off this page. Further, when the operation tab 17 is pulled to the near side (front side), image data currently displayed on the display 13 is selected and the transport mechanism 3 discharges the printing paper P having the image recorded thereon by the recording head 2, along the direction in which the operation tab 17 is pulled (to the front side). That is, when the users want the recording of a displayed image, they only have to pull the operation tab 17 in the near-side direction in which the printing paper P is discharged. Therefore, even users not good at operating devices can easily learn how to operate the operation tab 17 in order to record the image.

Further, it is possible to cancel the previous image selection (image recording) by pushing the operation tab 17 toward the attachment surface 6*a* as if the users were pushing back a page once selected by pulling. Since the above-described operations are all user intuition-oriented, even users not good at operating devices can easily get used to the operation. Incidentally, in the above explanation, the processing A and the processing B are performed to one image, but a plurality of images, after selected, may be collectively printed (the selection of these images may be collectively canceled). An example of operations in this case is to pull the operation tab 17 in a predetermined direction to select images to be printed as described above and to thereafter continuously pull the operation tab 17 twice to collectively print the images selected so far.

Processing for Recording Copy Number Change

Processing C to Processing F

When the users pull the lower end of the operation tab 17 diagonally downward (to the near side) from the attachment surface 6*a* as shown by the arrow d in FIG. 3, the image selection unit 33 increases the number of copies of the recording medium on which image data currently displayed on the display 13 is to be recorded by the recording head 2. On the other hand, when the users pull the upper end of the operation tab 17 diagonally upward (to the far side) from the attachment surface 6*a* as shown by the arrow e in FIG. 3, the image selection unit 33 decreases the number of copies of the recording medium on which the image data currently displayed on the display 13 is to be recorded by the recording head 2.

Specifically, when the lower end (lower side of the rotary shaft 18) of the operation tab 17 is pulled diagonally downward (to the near side) by the users in the away-direction away from the attachment surface 6*a* when the operation tab 17 is at a position a certain rotation angle away from the standby position, the electric resistance value in the second pressure sensor 22 provided at the lower end of the rotary shaft 18 increases because the pressing force acting thereon reduces. On the other hand, since the pressing force acting on the first pressure sensor 21 provided at the upper end of the rotary shaft 18 little changes, the first pressure sensor 21 detects no change in the pressing force. When only the second pressure sensor 22 detects the reduction in the pressing force in this manner, the image selection unit 33 recognizes that the lower end of the operation tab 17 is pulled diagonally downward. Then, the image selection unit 33 selects image data currently image-displayed on the display 13 and increases the number of copies of the printing paper P on which the image of the image data is to be recorded by the recording head 2 (processing C, processing D in FIG. 5).

On the other hand, when the upper end of the operation tab 17 (the upper side of the rotary shaft 18) is pulled diagonally upward (to the far side) by the users in the away-direction away from the attachment surface 6*a*, the pressing force acting on the first pressure sensor 21 provided at the upper end of the rotary shaft 18 decreases, so that the electric resistance value increases in the first pressure sensor 21. On the other hand, the second pressure sensor 22 provided at the lower end of the rotary shaft 18 detects no change in the pressing force since the pressing force acting thereon little changes. When only the first pressure sensor 21 detects the decrease in the pressing force in this manner, the image selection unit 33 recognizes that the upper end of the operation tab 17 is pulled diagonally upward. Then, the image selection unit 33 selects image data currently displayed on the display 13 and decreases the number of copies of the printing paper P on which the image of the image data is to be recorded by the recording head 2 (processing E, processing F in FIG. 5).

Further, the image selection unit 33 changes an increment number or a decrement number of the number of recording copies of the selected image data according to the degree of the push-pull operation to the operation tab 17 detected by the first and second pressure sensors 21, 22, that is, according to an increment/decrement amount of the pressing forces acting on the first and second pressure sensors 21, 22.

Concretely, as shown in the processing C and the processing E in FIG. 5, when a decrement amount of the pressing force detected by the first pressure sensor 21 or the second pressure sensor 22 is larger than a predetermined value (described as "strong" in FIG. 5), the increment number or the decrement number of the number of recording copies is increased (for example, ±5 sheets). On the other hand, as shown in the processing D and the processing F in FIG. 5, when the decrement amount of the pressing force detected by the first pressure sensor 21 or the second pressure sensor 22 is less than the predetermined value (described as "weak" in FIG. 5), the increment number or the decrement number of the number of recording copies is decreased (for example, ±1 sheet).

Then, when the processing for the image recording is executed by the above-described processing A after the number of recording copies of image data is finally decided by the processing for the recording copy number change, an image of this image data is recorded on the decided number of sheets of the printing paper P.

As described above, the users can increase the number of recording copies of image data image-displayed on the display 13, by pulling the lower end of the operation tab 17 diagonally downward (to the near side) as if they were selecting a predetermined page by turning a page of a book and thereafter tearing off the page by pulling the page to the near side. Conversely, the user can decrease the number of recording copies of image data image-displayed on the display 13, by pulling the upper end of the operation tab 17 diagonally upward (to the far side) as if they were returning the once selected page.

Processing for Display Image Rotation

Processing G, Processing H

When the operation tab 17 is operated by the users in a direction to perform an in-plane rotation (in an in-plane rotation direction) as shown by the arrow f in FIG. 3, the image selection unit 33 rotates an image currently displayed on the display 13.

Concretely, when the operation tab 17 which is at a position a certain rotation angle away from the standby position is pressed in the in-plane rotation direction to the near side, the upper end of the operation tab 17 is pulled from the attachment surface 6*a* and the lower end of the operation tab 17 is pushed toward the attachment surface 6*a*. Consequently, the pressing force acting on the first pressure sensor 21 provided at the upper end of the rotary shaft 18 reduces, and the pressing force acting on the second pressure sensor 22 provided at the lower end of the rotary shaft 18 increases.

When the first pressure sensor 21 detects that the upper end of the operation tab 17 is pulled and the second pressure sensor 22 detects that the lower end of the operation tab 17 is pushed toward the attachment surface 6*a* in this manner, the image selection unit 33 recognizes that the operation tab 17 is operated by the users so as to rotate toward the near side. Then, the image selection unit 33 causes the display 13 to rotate a currently displayed image right (clockwise) by a predetermined angle (for example, 90 degrees) (processing G in FIG. 5).

On the other hand, when the operation tab 17 is operated in the in-plane rotation direction toward the far side, the upper end of the operation tab 17 is pushed toward the attachment surface 6*a* and the lower end of the operation tab 17 is pulled from the attachment surface 6*a*. Therefore, the pressing force acting on the first pressure sensor 21 provided at the upper end of the rotary shaft 18 increases and the pressing force acting on the second pressure sensor 22 provided at the lower end of the rotary shaft 18 decreases.

When the first pressure sensor 21 detects that the upper end of the operation tab 17 is pushed toward the attachment surface 6*a* and the second pressure sensor 22 detects that the lower end of the operation tab 17 is pulled in this manner, the image selection unit 33 recognizes that the operation tab 17 is operated so as to rotate toward the far side. Then, the image selection unit 33 causes the display 13 to rotate a currently displayed image left (counterclockwise) by a predetermined angle (for example, 90 degrees) (processing H in FIG. 5).

Consequently, the users can easily rotate the image currently displayed on the display 13 only by performing the operation of rotating the operation tab 17 within the plane of the operation tab 17.

Incidentally, the rotation angle by which the image is rotated may be decided based on the degree of the user's operation of rotating the operation tab 17. That is, the rotation angle of the image may be decided based on an increment amount or a decrement amount of the pressing force detected by the first and second pressure sensors 21, 22. For example, an image may be rotated by a large angle when the users operate the operation tab 17 with a strong force, and may be rotated by a small angle when the users operate the operation tab 17 with a small force.

As described above, the printer 1 of the first embodiment is provided with the two pressure sensors 21, 22 which independently detect the push-pull operations to the both ends, of the operation tab 17, along the rotary shaft 18 direction, relative to the attachment surface 61. Therefore, it is possible to detect various behaviors of the operation tab 17. That is, it is possible to discriminatingly detect that the ends of the operation tab 17 are both pulled, that the ends are both pushed, that one of the ends of the operation tab 17 is pulled, or that one of the ends is pushed. The aforesaid plural kinds of processing (image recording, recording cancellation, increase/decrease in the number of recording copies, and image rotation) can be assigned to these operation states respectively. That is, only by operating the operation tab 17, it is possible to cause various kinds of processing to be performed to one image data image-displayed on the display 13.

According to the printer 1 of the first embodiment described above, the following effects can be obtained. Based on the information regarding the rotation operation to the operation tab 17 detected by the rotary encoder 20, the display image switching unit 32 determines what operation the users has performed. Concretely, based on information regarding the rotation direction, rotation angle, rotation speed, or the like of the operation tab 17, it is determined whether the users want to have an image of subsequent image data displayed on the display 13 or to have an image of preceding image data displayed on the display 13, and according to the order of the plural image data, the display image data is switched. That is, when the users rotates the plate-shaped operation tab 17 right/left as if they were turning a page of a book, the display image forward/backward feed can take place according to the rotation of the operation tab 17. Therefore, a complicated operation using the operation buttons 12 and the like is not necessary for the display image switching. Even users not good at operating devices can easily have a desired image displayed on the display 13 by switching the display image as if they were turning a page of a book.

Further, based on the detection results of the first and second pressure sensors 21, 22 detecting the push-pull operation to the operation tab 17, the image selection unit 33 decides whether to select image data image-displayed on the display 13 and performs processing such as the image recording to the selected image. Therefore, the users has a desired image displayed on the display 13 by rotating the operation tab 17 and thereafter operates the operation tab 17 to push/pull in the toward-direction/away-direction (pulling and pushing). By such a simple operation, the users can easily select an image displayed on the display 13 and can cause the processing such as recording to be performed to the selected image. That is, there is no need to operate a part other than the operation tab 17 when image data which is a target of the processing such as recording is selected from the plural image data recorded in the data recording medium 7. Therefore, even users not good at operating devices can easily cause the printer 1 to perform the image selection and the processing following the selection.

Next, modified forms in which the first embodiment described above is variously modified will be explained. Components having substantially the same configuration as those of the above embodiment will be denoted by the same reference numerals and symbols, and explanation thereof will be omitted when appropriate.

First Modified Form

In the first embodiment, when the rotation speed of the operation tab 17 is lower than the predetermined speed, the display image switching unit 32 switches an image to be displayed on the display 13. Further, when the rotation speed is equal to the predetermined speed or higher, the display image switching unit 32 determines that this operation is intended for returning the operation tab 17 and does not perform the image switching (see FIG. 5). However, the display image switching unit 32 may perform the image switching when it is detected that the operation tab 17 once rotated at a low rotation speed in one direction as if a page were turned is subsequently rotated at a high rotation speed in the opposite direction so as to be returned to the original position. That is, the slow rotation operation to the operation tab 17 in one direction and the subsequent quick rotation operation to the operation tab 17 in the opposite direction may be regarded as a series of operations, and when this series of operations is detected, the display image switching unit 32 may recognize that the image switching is instructed by users.

FIG. 6 shows the processing contents of a display image switching process of a modified form 1. In the display image switching process of the modified form 1, as in the first embodiment, the image folder name is displayed on the display 13 when the operation tab 17 is at the standby position (processing A).

On the other hand, when the operation tab 17 is rotated right at a slow speed lower than the predetermined speed (rotation speed: low) and thereafter is rotated left at a speed equal to the predetermined speed or higher (rotation speed: high), the display image switching unit 32 determines that the users are requesting the image forward feed. At this time, the display image switching unit 32 changes the image to be displayed on the display 13 to an immediately subsequent image (processing B). When the operation tab 17 is rotated left at a slow speed lower than the predetermined speed (rotation speed: low) and is thereafter rotated right at a speed equal to the predetermined speed or higher (rotation speed: high), the display image switching unit 32 determines that the users is requesting the image backward feed. At this time, the display image switching unit 32 switches an image to be displayed on the display 13 to an immediately preceding image (processing C).

Second Modified Form

While the user's rotation operation to the operation tab 17 for the display image switching is underway, the display image switching unit 32 may synthesize image data selected before and after the image switching based on the rotation angle information of the operation tab 17 detected by the rotary encoder 20 and cause the display 13 to display the synthesis image.

Figure 7A:
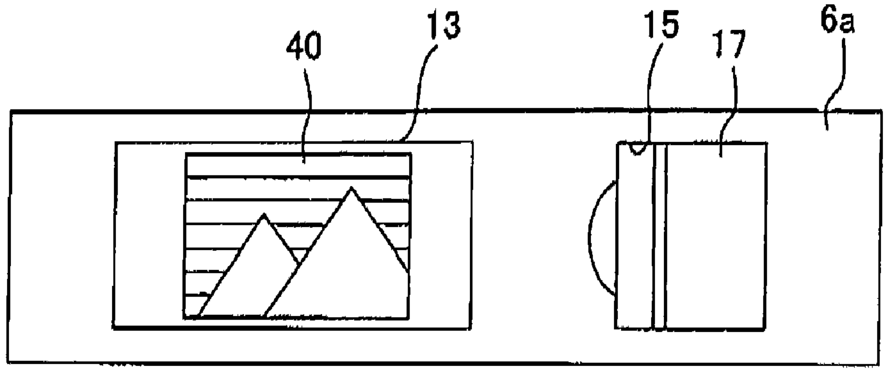
FIG. 7A and FIG. 7B are views showing a state immediately before image display switching of a modified form 2, FIG. 7A being a view of an attachment surface seen from above and FIG. 7B being a view of the attachment surface seen from a direction parallel to the surface.
Figure 7B:
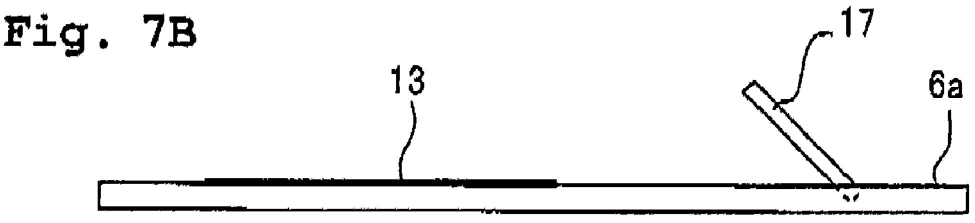
Figure 8A:
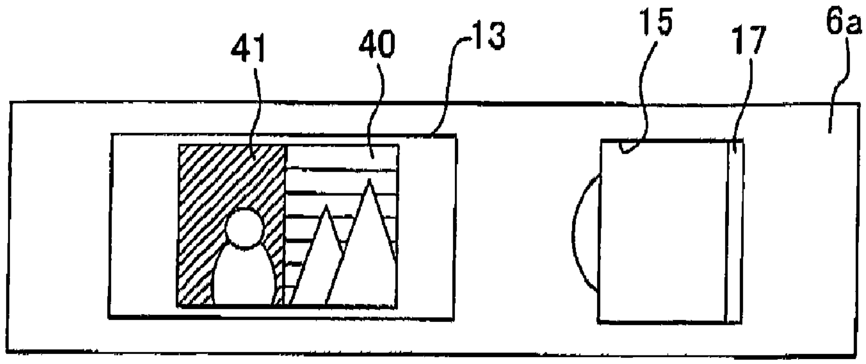
FIG. 8A and FIG. 8B are views showing a state in which the image display switching of the modified form 2 is underway, FIG. 8A being a view of the attachment surface seen from above and FIG. 8B being a view of the attachment surface seen from the direction parallel to the surface.
Figure 8B:
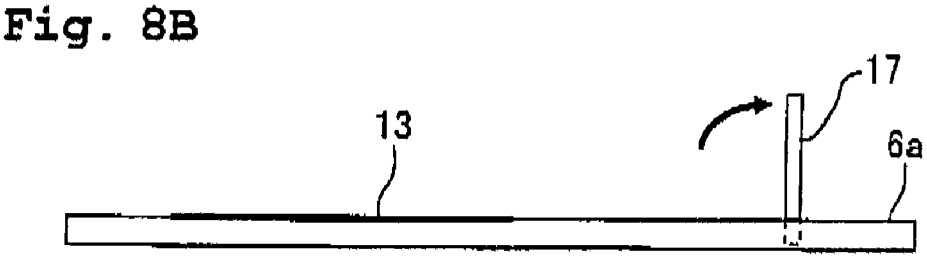
Figure 9A:
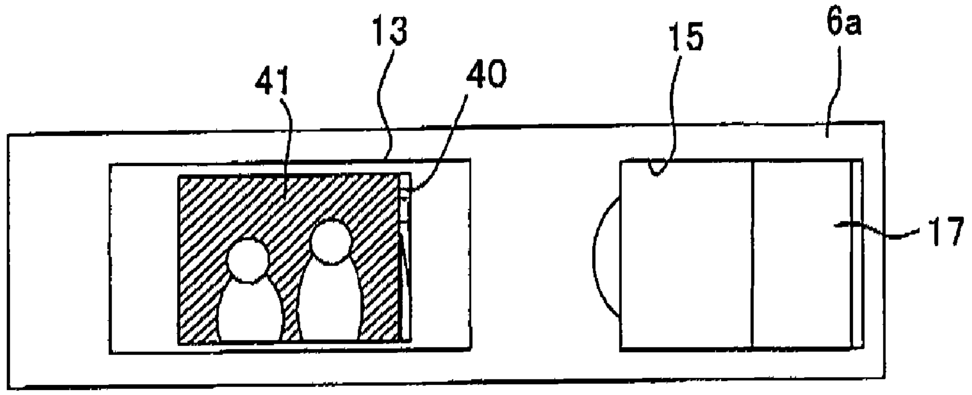
FIG. 9A and FIG. 9B are views showing a state immediately before the completion of the image display switching of the modified form 2, FIG. 9A being a view of the attachment surface seen from above and FIG. 9B being a view of the attachment surface seen from the direction parallel to the surface.
Figure 9B:
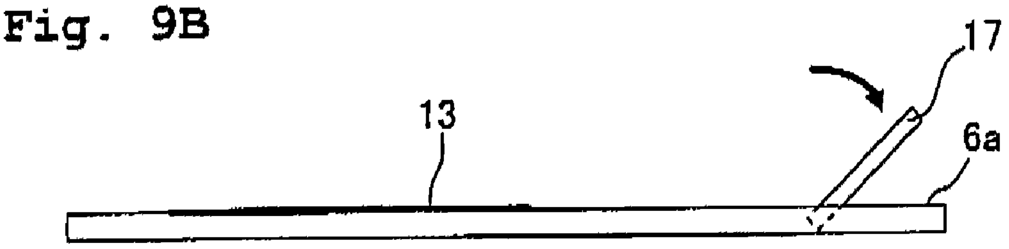

A concrete example of the above will be explained with reference to FIGS. 7A, B to FIGS. 9A, B. As shown in FIG. 7A, it is assumed that an image 40 (landscape picture) of some image data is displayed on the display 13. At this time, when the users rotate the operation tab 17 right at a slow speed lower than the predetermined speed, the display image switching unit 32 switches an image to be displayed on the display 13 to a subsequent image 41 (a portrait picture) as shown in FIG. 8A.

The display image switching unit 32 synthesizes the image data of the landscape picture previously displayed and the subsequent image data of the portrait picture according to the rotation angle of the operation tab 17 detected by the rotary encoder 20, and generates the synthesis image data showing that the image switching is underway. An image of the synthesis image data is displayed on the display 13. Specifically, as shown in FIG. 8A and FIG. 9A, when the synthesis image is displayed, the images 40, 41 selected before and after the image switching are changed in their occupation areas on the display 13 according to the rotation angle of the operation tab 17. In this case, as the operation tab 17 rotates right, the latter image 41 of the portrait picture appears from the left, and accordingly, the image 40 of the landscape picture originally displayed is pushed right. Consequently, the users can feel as if the images 40, 41 were sliding from left to right on the display 13.

According to this structure, the users can feel that the display image is switched in linkage with the rotation of the operation tab 17. Further, only by slightly rotating the operation tab 17 in one direction, the users can check an image to which the display image is switched according to the rotation direction of the operation tab 17. Therefore, the users can easily recognize in which direction the operation tab 17 should be rotated when the users wants the image forward/backward feed. Incidentally, the synthesis image displayed on the display 13 is not necessarily generated so that the image displayed next (subsequent image) appears from one side and accordingly the width of the image previously displayed (preceding image) becomes smaller. For example, the synthesis image may be generated so that the subsequent image appears from one side and accordingly the preceding image is forced to move to the one side, or so that the subsequent image appearing from one side is overlaid on the still previous image. In any case, the users can intuitively recognize whether the images are forward-fed or backward-fed, based on the direction from which the subsequent image appears.

Third Modified Form

The display image switching unit 32 may cause the display 13 to display an image of a virtual book, and when users rotate the operation tab 17, cause the display 13 to display an image, which is selected for display by the rotation of the operation tab 17, in the book in an open state.

Figure 10A:
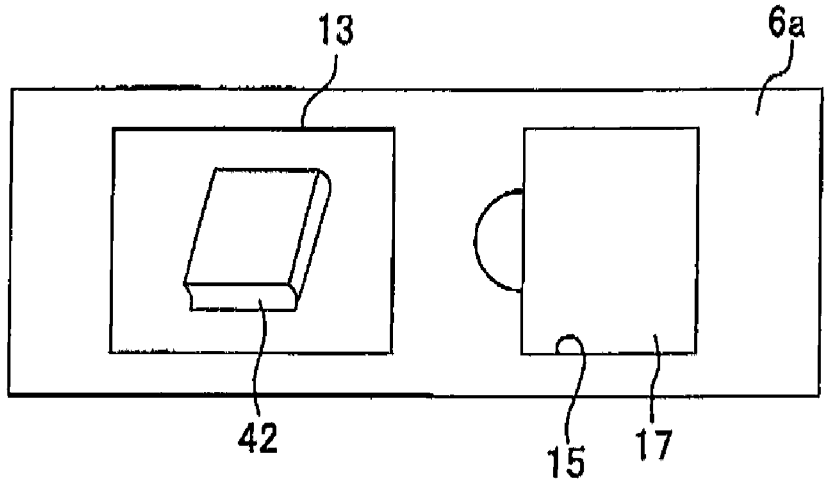
FIG. 10A and FIG. 10B are views showing the attachment surface of a modified form 3 seen from above, FIG. 10A showing a state where the operation tab is on standby and FIG. 10B showing a state where the operation tab is rotated.
Figure 10B:
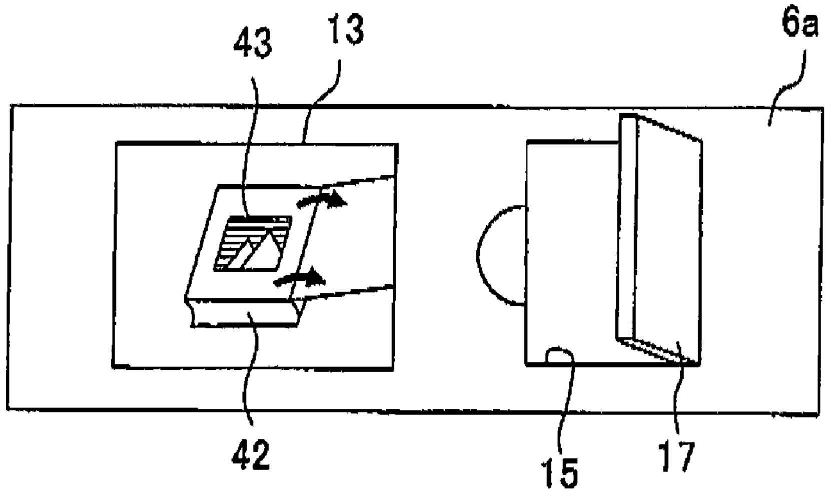

As shown in FIG. 10A, when the operation tab 17 is at the standby position on the attachment surface 6*a*, the display image switching unit 32 causes the display 13 to display an image of a book 42 in a closed state. Then, when the users rotates the operation tab 17 as shown in FIG. 10B, the display image switching unit 32 causes the display 13 to display a predetermined image. The predetermined image is an image resulting from the synthesis of image data of the book 42 in the open state and image data selected for display according to the rotation operation to the operation tab 17, and is an image in which an image 43 of the image data is inserted in the book 42 in the open state. That is, when the users rotates the operation tab 17 left or right, a page of the book 42 in the display 13 is turned according to the rotation, and at the same time, the image 43 in the book 42 is switched according to the rotation operation to the operation tab 17. Consequently, when performing the rotation operation to the operation tab 17, the users can feel as if they were turning a page of the book 42.

Preferably, the direction in which the book 42 displayed on the display 13 is opened and the rotation direction in which the operation tab 17 rotates from the standby position on the attachment surface 6*a* are the same direction (right in FIGS. 10A, B), as shown in FIGS. 10A, B. In this case, since the rotation direction in which the operation tab 17 rotates from the standby state and the direction in which the virtual book 42 displayed on the display 13 is opened are the same, the users can easily recognize in which rotation direction they should rotate the operation tab 17 when desiring the image forward feed. Specifically, if the book 42 displayed on the display 13 is a right-opening book as shown in FIG. 10A, the users can intuitively recognize that the operation tab 17 should be rotated in the page turning direction of the book 42, that is, in the right direction when they desires the image forward feed.

Further, when the users performs an operation of selecting an image displayed on the display 13 by an operation such as pulling the lower end of the operation tab 17 downward, a bookmark indicating that the image is selected may be attached to a page on which the selected image is displayed, of the book 42 displayed on the display 13. Displaying the bookmark on the book 42 displayed on the display 13 makes it possible for the users to intuitively recognize that they has performed the operation of selecting the image.

Fourth Modified Form

The way the image selection unit 33 assigns various kinds of the processing to the push-pull operations to the operation tab 17 is not limited to that of the first embodiment shown in FIG. 5. For example, between the processing A, B and the processing C to F in FIG. 5, the processing contents may be assigned in an interchanged manner to the behaviors of the operation tab 17.

Specifically, increasing the number of recording copies of image data displayed on the display 13 may be assigned to the operation of pulling the operation tab 17 in the away-direction away from the attachment surface 6*a* (the first pressure sensor 21 "−" and the second pressure sensor 22 "−"). Decreasing the number of recording copies of the image data displayed on the display 13 may be assigned to the operation of pushing the operation tab 17 in the toward-direction toward the attachment surface 6*a* (the first pressure sensor 21 "+" and the second pressure sensor 22 "+").

Further, when the operation tab 17 is pulled toward the lower end of the rotary shaft 18 (the first sensor 21 "no change" and the second pressure sensor 22 "−"), currently displayed image data may be selected so that the recording head 2 records an image of the selected image data. Further, when the operation tab 17 is pulled toward the upper end of the rotary shaft 18 after the image data is thus once selected (the first pressure sensor 21 "−" and the second pressure sensor 22 "no change"), the previous selection of the image data (image recording) may be cancelled.

Further, the processing (the processes contents) performed to the selected image data by the image selection unit 33 is not limited to the processing shown in FIG. 5 (image recording, increase/decrease in the number of recording copies, or image rotation). For example, processing such as a change in density of color displayed on the display 13 or enlarged/reduced display of an image may be performed to the selected image data. Alternatively, for example, when the rotation operation to the operation tab 17 is performed at a predetermined speed, a predetermined number of images may be skipped and a subsequent image may be displayed, instead of displaying a subsequent image on the display 13 one by one in order.

Fifth Modified Form

In the first embodiment, when a plurality of image folders (image data groups) are stored in the data recording medium 7, the users selects a desired image folder from the image folders by operating a part other than the operation tab 17, such as the operation button 12. Further, image data belonging to the selected image folder are displayed on the display 13. However, the selection of the image folder may be made possible by the operation to the operation tab 17.

Figure 11:
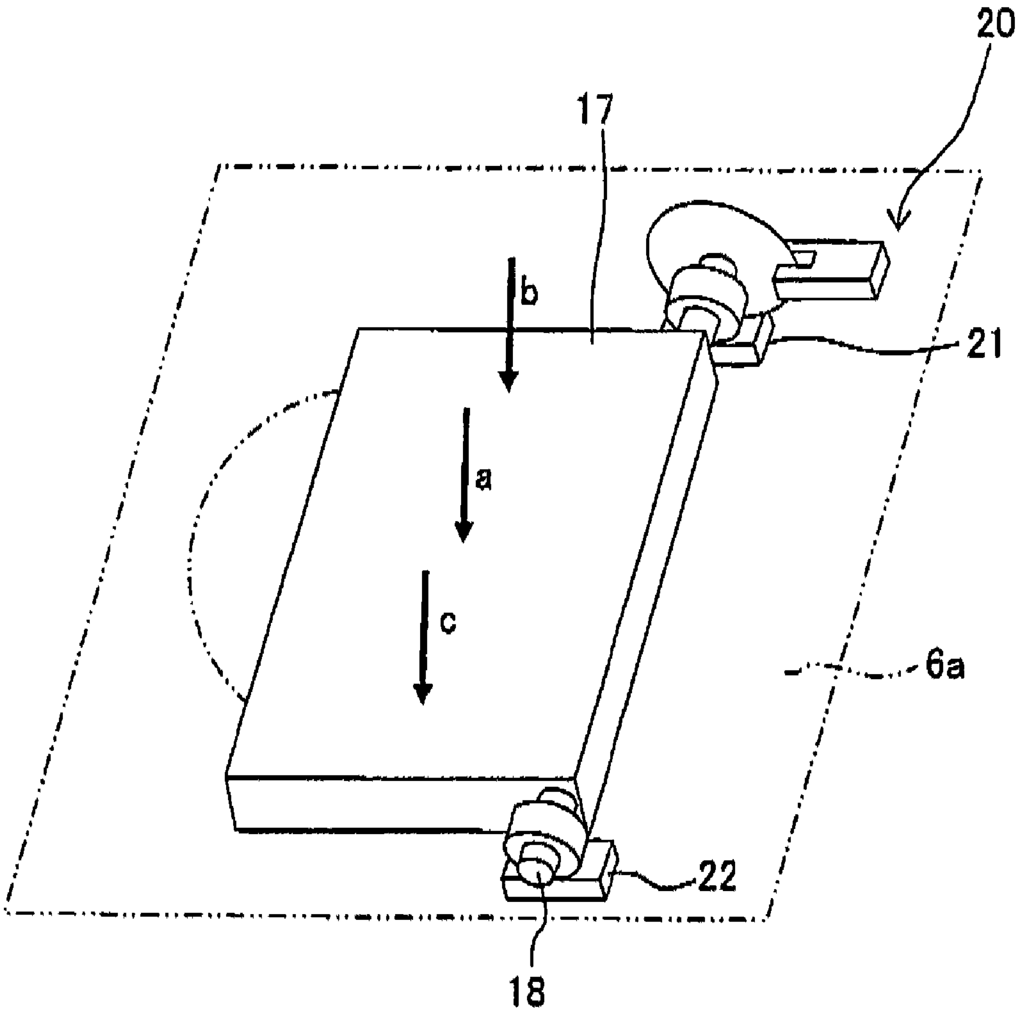
FIG. 11 is a perspective view of an operation tab of a modified form 5.

For example, users may select a desired image folder by pushing a center portion, an upper end portion, or a lower end portion of the operation tab 17 when the operation tab 17 is placed on the attachment surface 6*a*, as shown in FIG. 11.

A case will be assumed where the image folders are stored in the data recording medium 7 in predetermined order-based on a predetermined condition such as the image folder names (for example, alphabetical order) or the dates when the image folders are prepared. When the data recording medium 7 is connected to the printer 1, the display image switching unit 32 causes the display 13 to display the name of the first image folder among the image folders.

Next, when the users push the center portion of the operation tab 17 as shown by the arrow a in FIG. 11 while it is detected by the rotary encoder 20 that the operation tab 17 is at the standby position, the first pressure sensor 21 and the second pressure sensor 22 both detect an increase in the pressing forces as shown in FIG. 12. Consequently, the display image switching unit 32 recognizes that the center portion of the operation tab 17 at the standby position is pressed and selects the image folder currently displayed on the display 13 as an image folder which is a target of image display (process A in FIG. 12).

When the upper end portion of the operation tab 17 is pushed as shown by the arrow b in FIG. 11, only the first pressure sensor 21 detects an increase in the pressing force as shown in FIG. 12. Consequently, the display image switching unit 32 recognizes that the upper end portion of the operation tab 17 at the standby position is pushed and switches the name of the image folder displayed on the display 13 to the name of an image folder immediately preceding the image data whose name is currently displayed (processing B).

On the other hand, when the lower end portion of the operation tab 17 is pushed as shown by the arrow c in FIG. 11, only the second pressure sensor 22 detects an increase in the pressing force as shown in FIG. 12. Consequently, the display image switching unit 32 recognizes that the lower end portion of the operation tab 17 at the standby position is pushed and switches the name of the image folder displayed on the display 13 to the name of an image folder immediately subsequent to the image folder whose name is currently displayed.

When the center portion of the operation tab 17 is pressed after the image folder name to be displayed is thus switched, the display image switching unit 32 selects the image folder of which name is currently displayed on the display 13 as an image folder which is a target of the image display. When the users rotate the operation tab 17 after selecting the image folder, the rotary encoder 20 detects such an operation. At this time, the display image switching unit 32 causes the display 13 to display the fist image data among images of the image data belonging to the selected image folder.

In this case, when a plurality of image folders are recorded in the data recording medium 7, the users can select an image folder to which image data to be image-displayed belongs, only by operating the operation tab 17, without any need to operate a part other than the operation tab 17. Incidentally, when the operation of selecting an image folder is performed as described above, books corresponding to the respective image folders may be displayed on the display 13. For example, a bookshelf on which the plural books are placed may be displayed in the display 13 and a book to be selected may be made changeable by the operation to the operation tab 17. At this time, if, for example, an image showing the selected book is drawn out from the bookshelf is displayed in the display 13, the users can perform the operation of selecting the image folder as if they were selecting a book from the bookshelf.

Sixth Modified Form

Figure 13:
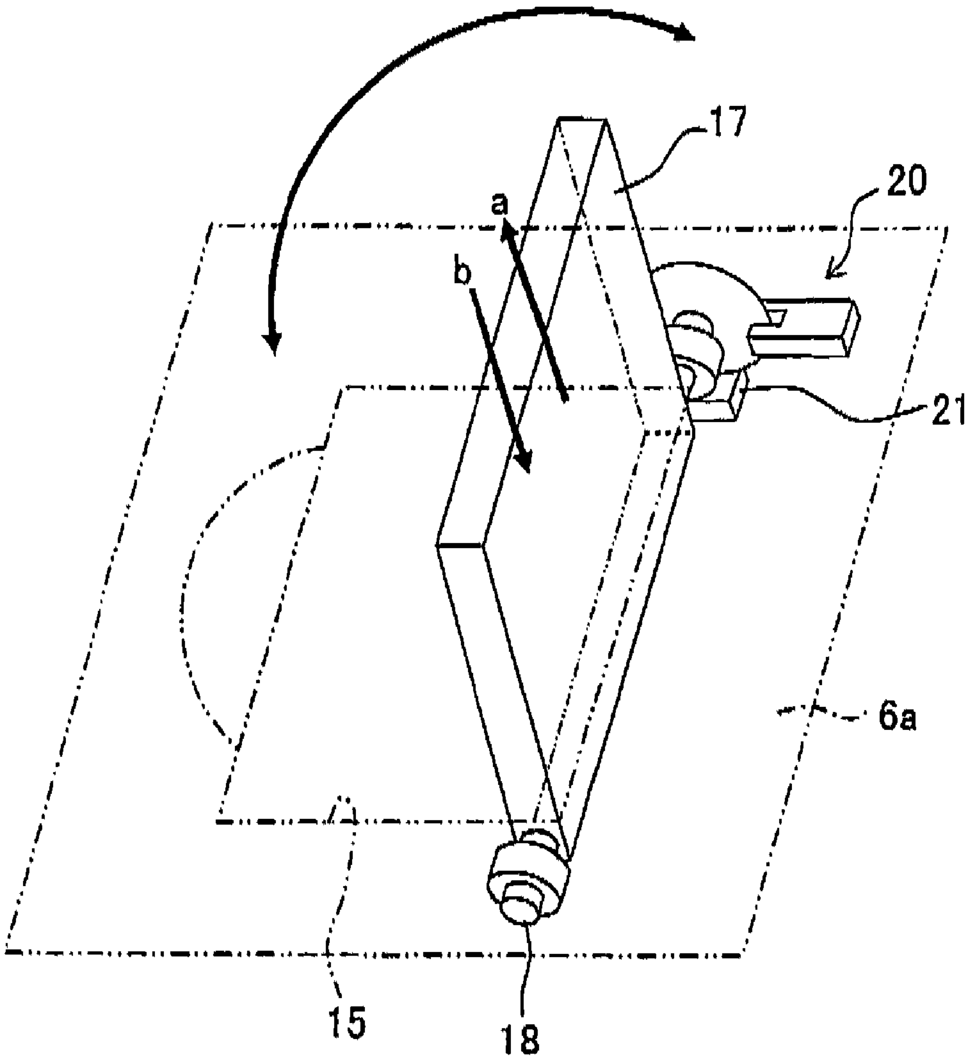
FIG. 13 is a perspective view of an operation tab of a modified form 6.

In the first embodiment described above, the pressure sensors 21, 22 are provided at the both ends of the rotary shaft 18 of the operation tab 17 respectively. But one of the pressure sensors may be omitted. For example, only the pressure sensor 21 between the upper end of the rotary shaft 18 and the attachment surface 6*a* may be provided, as shown in FIG. 13. When only the single pressure sensor 21 is thus provided, two kinds of operations (push-pull operations) can be detected, that is, the operation of pulling the operation tab 17 from the attachment surface (the arrow a in FIG. 13) and the operation of pushing the operation tab 17 toward the attachment surface 6*a* (the arrow b in FIG. 13) can be detected. Therefore, the processing contents of the image selection unit 33 (image recording, increase/decrease in the number of recording copies, and the like) can be assigned to these two kinds of push-pull operations.

For example, when the pressure sensor 21 detects that the operation tab 17 is pulled in the away-direction away from the attachment surface 6*a* (decrease in the pressing force), the image selection unit 33 causes the recording head 2 controlled by the recording control unit 30 to record image data currently displayed on the display 13 on the printing paper P. On the other hand, when the pressure sensor 21 detects that the operation tab 17 is pushed in the toward-direction toward the attachment surface 6*a* (increase in the pressing force) after the image is selected, the image selection unit 33 cancels the previous selection (image recording) of the image data.

Seventh Modified Form

Figure 27:
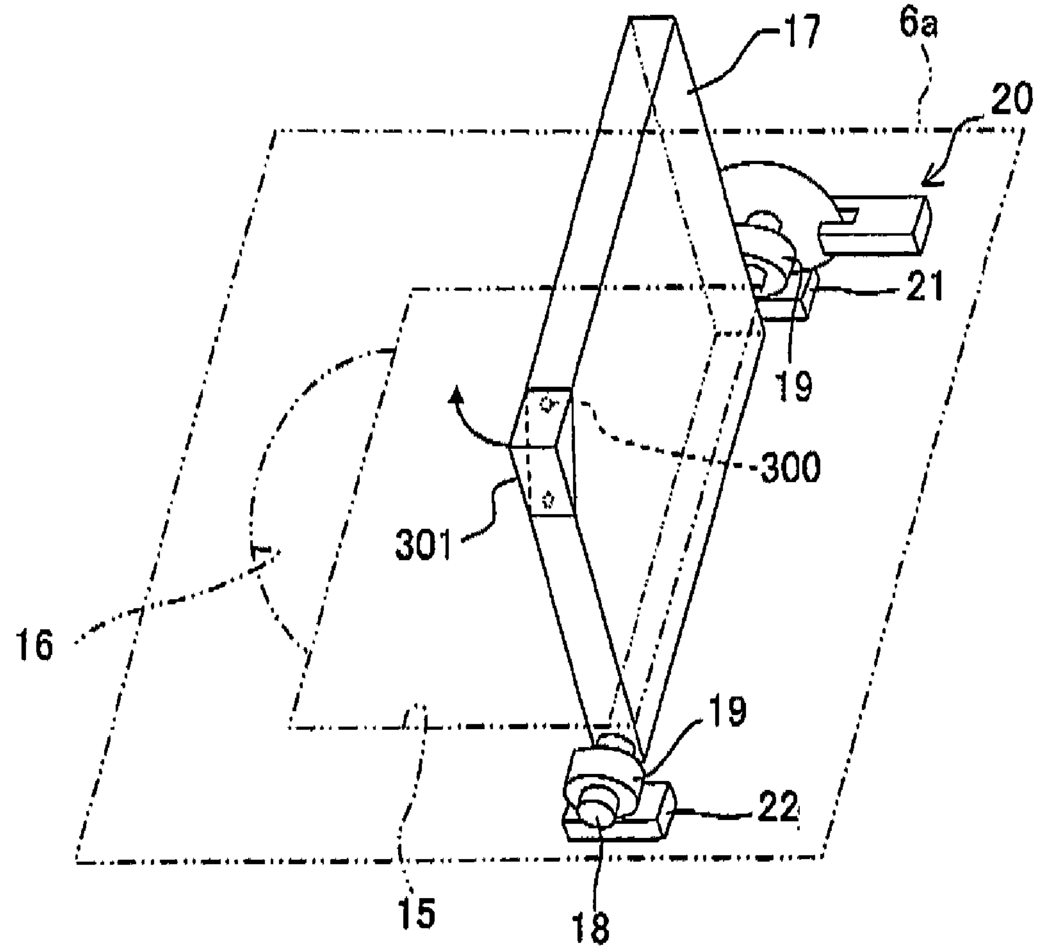
FIG. 27 is a perspective view of an operation tab of a modified form 7.

The rotary shaft 18 of the operation tab 17 may be provided with three or more pressure sensors along the rotary shaft 18. In this case, more complicated operations (for example, the push-pull operations) to the operation tab 17 can be detected, and after the selection of an image displayed on the display 13, it is possible to perform many kinds of processing to the selected image data. Alternatively, another sensor may be provided in the operation tab 17. For example, as shown in FIG. 27, a switch 300 detecting an operation of folding a lower corner 301 of the operation tab 17 may be provided at a lower corner of the operation tab 17. For example, when the switch 300 detects that the lower corner 301 of the operation tab 17 is folded, the image displayed on the display 13 may be selected. Such an operation corresponds to an operation of folding a corner of a page of a book as an ear mark and is included in the book-like operation.

Eighth Modified Form

In the first embodiment, when users rotate the operation tab 17, the display image switching unit 32 switches an image to be displayed on the display 13 according to the rotation operation. When the users thereafter pull the operation tab 17 in the away-direction away from the attachment surface 6*b* or push the operation tab 17 in the toward-direction toward the attachment surface 6*a*, the image selection unit 33 selects image data displayed on the display 13 based on the push-pull operation to the operation tab 17. On the other hand, in the eighth modified form, the operation tab 17 is operated only for the display image switching. Then, for the selection of image data displayed on the display 13, a member, other than the operation tab 17, provided in the printer 1 (for example, the operation button 12 shown in FIG. 1) is operated.

Ninth Modified Form

In the first embodiment described above, the rotary shaft 18 is provided along the right edge of the operation tab 17, and the operation tab 17 is opened in the right direction from the standby state, which corresponds to a right-opening book. On the other hand, an operation tab of the ninth modified form corresponds to a left-opening book, that is, it has the rotary shaft 18 along its left edge and is opened in the left direction from the standby state.

Tenth Modified Form

In the first embodiment described above, the display 13 and the operation tab 17 are provided side by side on the attachment surface 6*a*. On the other hand, the layout of the display 13 and the operation tab 17 in the tenth modified form may also be possible. That is, the display 13 is provided on an upper surface of the operation tab 17 housed in the recess 15. In this case, since users can have a more real feeling of turning a page of a book when rotating the operation tab 17, the users can more easily have a desired image displayed on the display 13.

Second Embodiment

Figure 14:
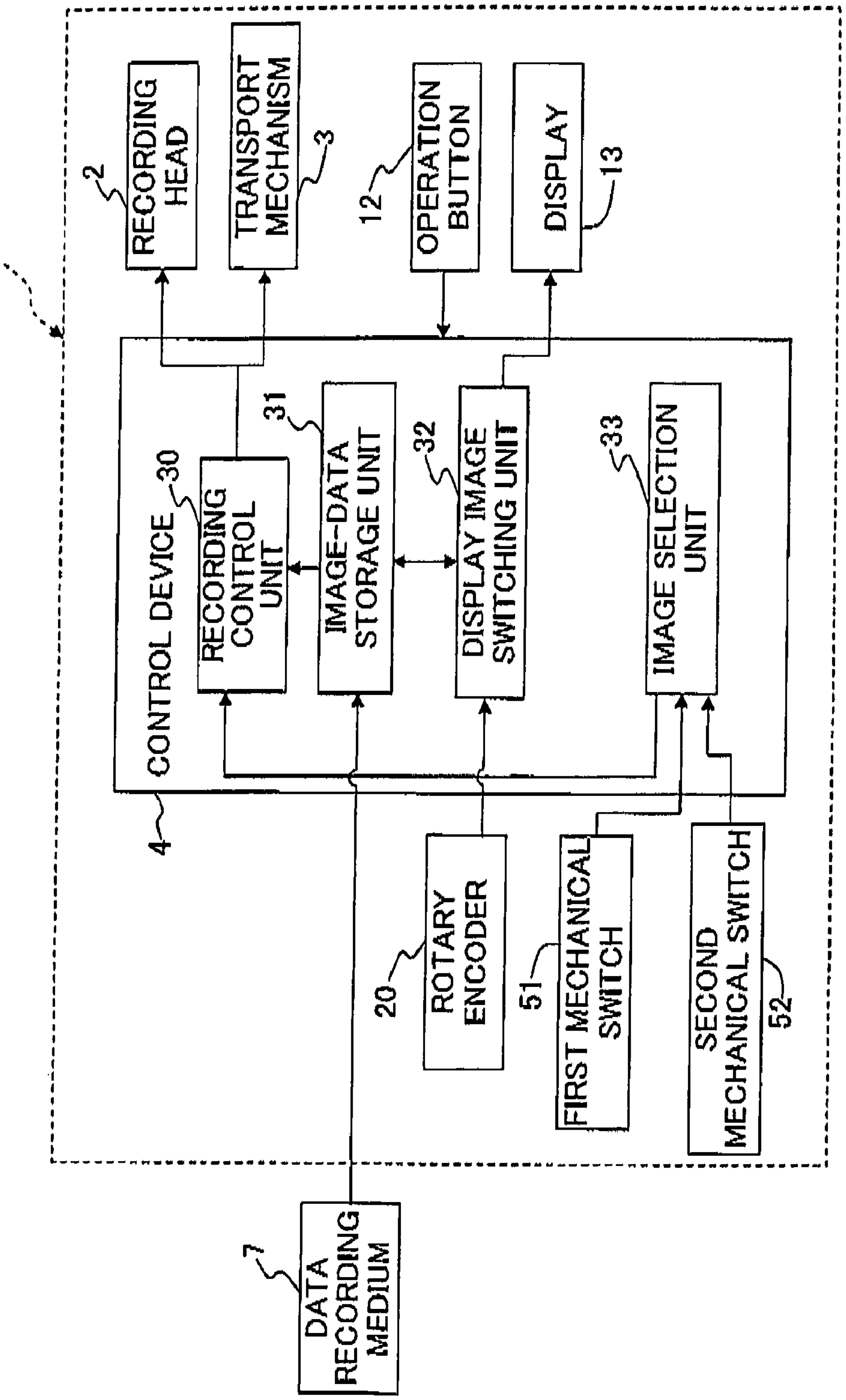
FIG. 14 is a block diagram schematically showing the electrical configuration of a printer according to a second embodiment.
Figure 15:
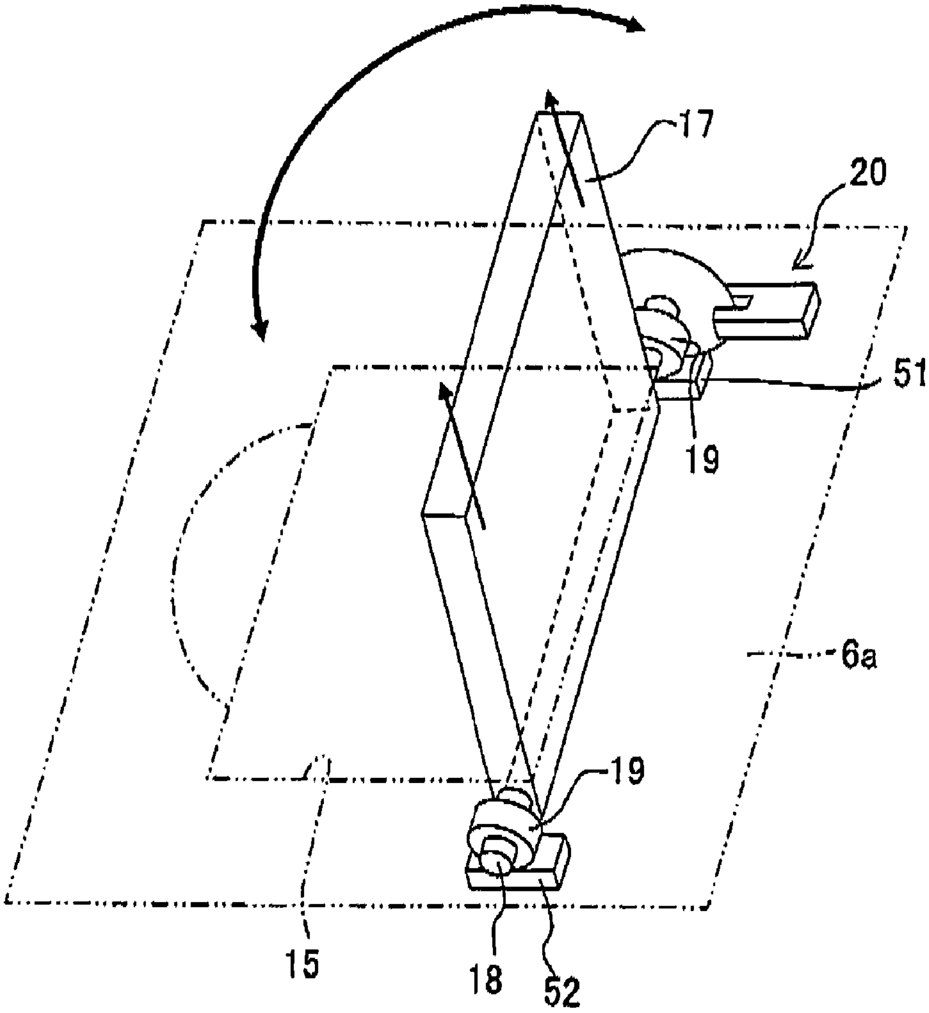
FIG. 15 is a perspective view of an operation tab of the second embodiment.

Next, a second embodiment of the present invention will be explained. FIG. 14 is a block diagram showing the electrical configuration of a printer 1 of the second embodiment, and FIG. 15 is a perspective view of an operation tab 17 of the second embodiment. In the second embodiment, as a detecting mechanism detecting the push-pull operation to the operation tab 17, mechanical switches are used. The same components as those of the first embodiment will be denoted by the same reference numerals and symbols and explanation thereof will be omitted when appropriate.

As shown in FIG. 15, both ends of a rotary shaft 18 of the operation tab 17 in a rectangular plate shape are rotatably supported by two bearings 19. Therefore, the operation tab 17 is rotatable about the rotary shaft 18 relative to an attachment surface 6*a*. A rotary encoder 20 detecting the rotation (rotation direction, rotation angle, rotation speed, and the like) of the operation tab 17 is attached to an upper end of the rotary shaft 18. Further, the mechanical switches (a first mechanical switch 51 and a second mechanical switch 52) are provided between the two bearings 19 supporting the upper end and the lower end of the rotary shaft 18 respectively and the attachment surface 6*a*. Further, the rotary shaft 18 is biased toward the attachment surface 6*a* by a biasing mechanism (not shown) such as a coil spring, and the two bearings 19 attached to the rotary shaft 18 are pressed toward the two mechanical switches 51, 52 respectively.

When the operation tab 17 is not operated, the rotary shaft 18 is pressed toward the attachment surface 6*a* by the coil spring or the like. Therefore, the mechanical switches 51, 52 are ON. When the operation tab 17 is pulled in the away-direction away from the attachment surface 6*a* from this state, the mechanical switches 51, 52 become OFF. That is, the two mechanical switches 51, 52 correspond to a push-pull operation detecting mechanism which detects an operation of making the operation tab 17 move away from/approach the mounting surface 6*a* (push-pull operation).

In the second embodiment, users can rotate the plate-shaped operation tab 17 as if they were turning a page of a book. At this time, the rotation operation to the operation tab 17 is detected by the rotary encoder 20. Then, an image to be displayed on a display 13 is switched according to the rotation operation. The switching of the display image is the same as that of the first embodiment and therefore detailed explanation thereof will be omitted.

Further, when the users pull the plate-shaped operation tab 17 in the away-direction away from the attachment surface 6*a* or push the operation tab 17 in the toward-direction toward the attachment surface 6*a*, this operation (push-pull operation) is detected by the two mechanical switches 51, 52. Image data displayed on the display 13 is selected according to the detected operation.

This image selection process by an image selection unit 33 will be explained with reference to FIG. 16. As shown in FIG. 16, the two mechanical switches 51, 52 can detect user's operations to the operation tab 17 such as pulling (processing A in FIG. 16), diagonally downward (to the near side) pulling (processing B), and diagonally upward (to the far side) pulling (processing C).

Users can pull the operation tab 17 in a direction, perpendicular to the rotary shaft 18, away from the attachment surface 6*a* when the operation tab 17 is a certain rotation angle away from the standby position. At this time, the two mechanical switches 51, 52 both shift from ON to OFF, and the image selection unit 33 recognizes that the operation tab 17 is pulled. At this time, the image selection unit 33 selects image data currently image-displayed on a display 13 and sends a recording control unit 30 a signal for instructing the start of the recording of an image of the selected image data (processing A). Then, the recording control unit 30 controls a recording head 2 and a transport mechanism 3 so that the displayed image of the image data is recorded on printing paper P.

When the lower end of the operation tab 17 along the rotary shaft 18 is pulled by the users in the away-direction away from the attachment surface 6*a*, the second mechanical switch 52 provided at the lower end of the rotary shaft 18 shifts from ON to OFF. The first mechanical switch 51 provided at the upper end of the rotary shaft 18 is kept ON. Consequently, the image selection unit 33 recognizes that the lower end of the operation tab 17 is pulled in the away-direction. Then, the image selection unit 33 selects image data currently image-displayed on the display 13 and increases, by one, the number of recording copies of the printing paper P on which this image data is to be recorded by the recording head 2 (processing B).

When the upper end of the operation tab 17 along the rotary shaft 18 is pulled in the away-direction away from the attachment surface 6*a*, the first mechanical switch 51 provided at the upper end of the rotary shaft 18 shifts from ON to OFF. The second mechanical switch 52 provided at the lower end of the rotary shaft 18 is kept ON. Consequently, the image selection unit 33 recognizes that the upper end of the operation tab 17 is pulled in the away-direction. Then, the image selection unit 33 selects image data currently image-displayed on the display 13 and decreases, by one, the number of copies of the printing paper P on which the image data is to be recorded by the recording head 2 (processing C).

In this manner, the two mechanical switches 51, 52 detect the push-pull operations to the operation tab 17. Consequently, the image selection unit 3 can select image data image-displayed on the display 13 based on the detection results of the mechanical switches 51, 52. Further, the two mechanical switches 51, 52 are attached to the operation tab 17 and thus are capable of detecting the push-pull operations to the both ends, along a direction parallel to the rotary shaft 18, of the operation tab 17, respectively. Therefore, it is possible to discriminatingly detect a plurality of push-pull operations to the operation tab 17, and a plurality of kinds of processing to the selected image data can be assigned to these push-pull operations.

The way the image selection unit 33 assigns various kinds of the processing to the push-pull operations to the operation tab 17 is not limited to that shown in FIG. 16. For example, when it is detected that the lower end of the operation tab 17 is pulled, the image selection unit 33 may select an image to cause the recording head 2 to record the image on the printing paper P. Further, when it is detected that the upper end of the operation tab 17 is pulled, the image selection unit 33 may cancel the recording of the image.

Third Embodiment

Figure 17:
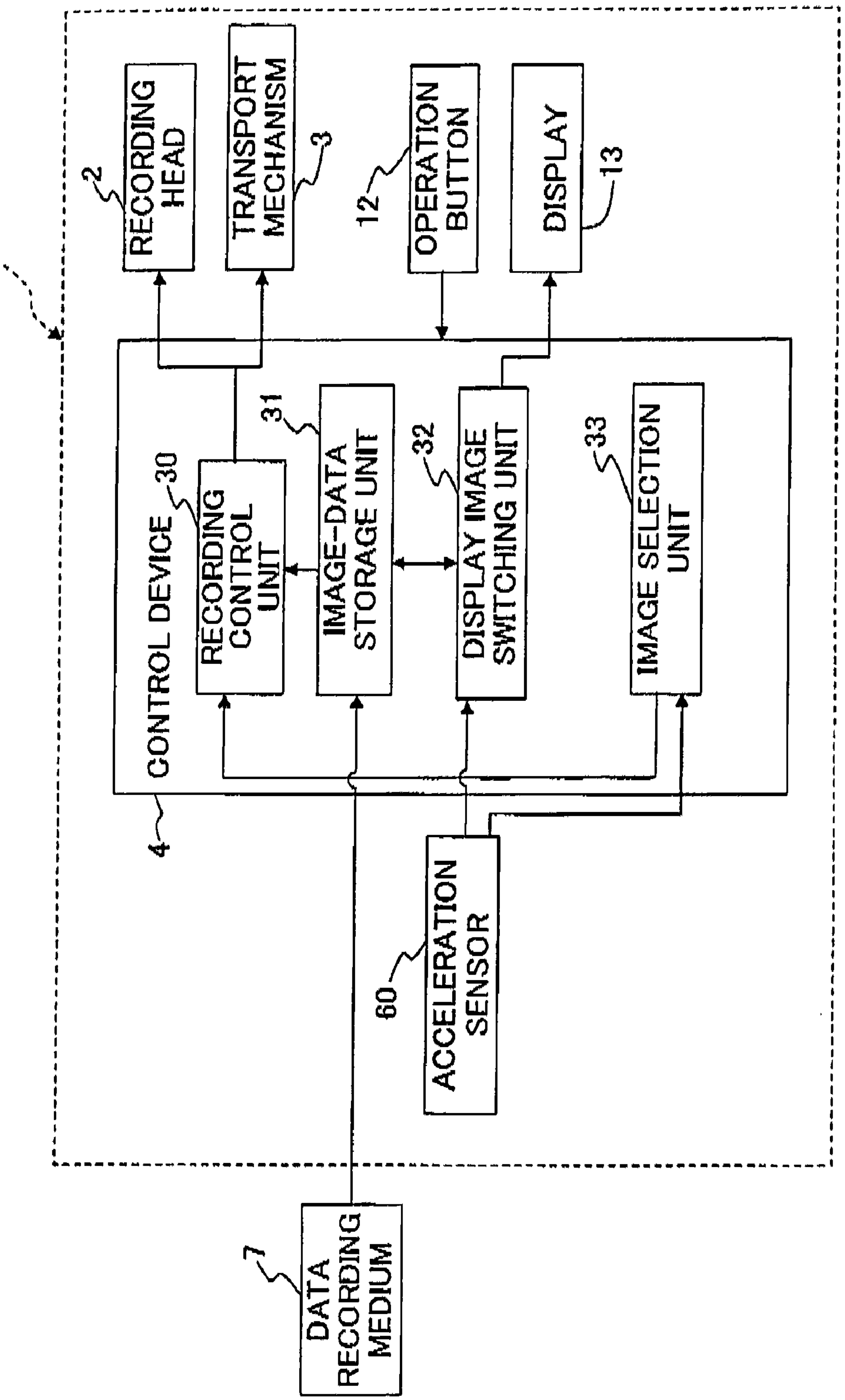
FIG. 17 is a block diagram schematically showing the electrical configuration of a printer according to a third embodiment.
Figure 18:
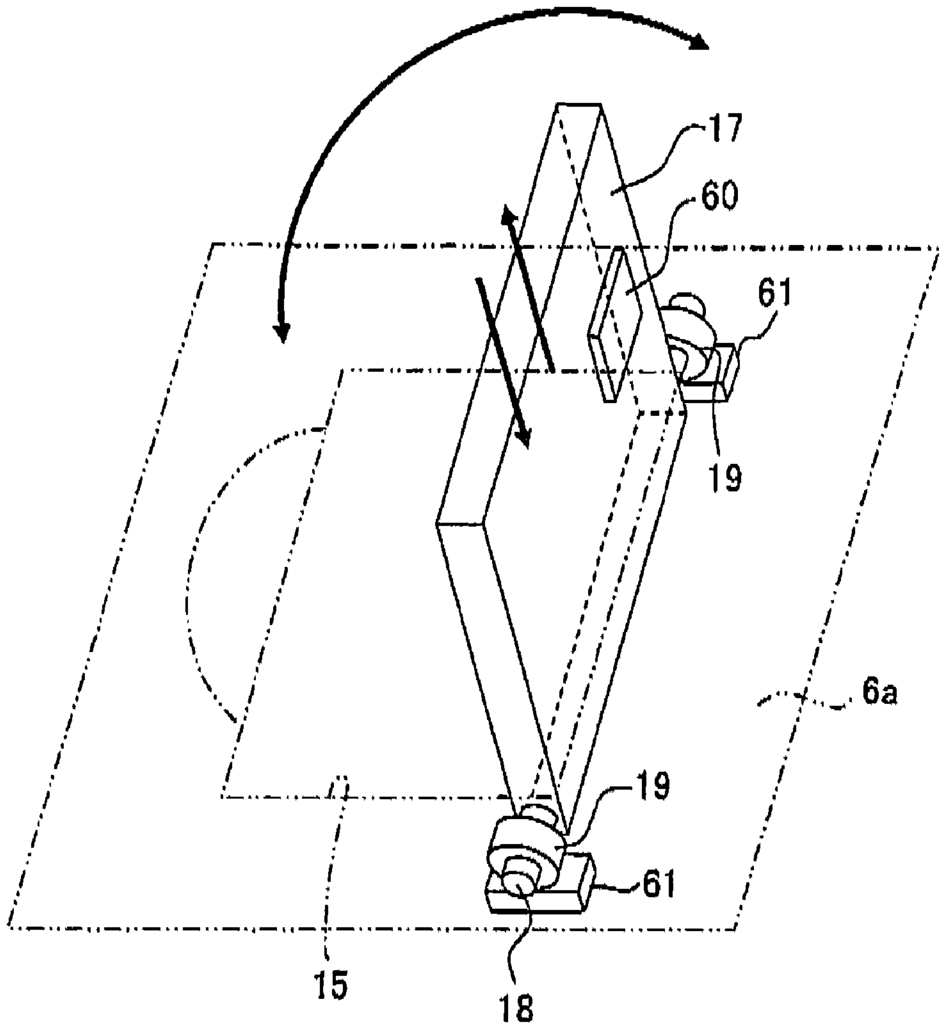
FIG. 18 is a perspective view of an operation tab of the third embodiment.

Next, a third embodiment of the present invention will be explained. FIG. 17 is a block diagram showing the electrical configuration of a printer 1 of the third embodiment, and FIG. 18 is a perspective view of an operation tab 17 of the third embodiment. In the third embodiment, as a detecting mechanism detecting both a rotation operation and a push-pull operation to the operation tab 17, an acceleration sensor is used. The same components as those of the first embodiment will be denoted by the same reference numerals and symbols and explanation thereof will be omitted when appropriate.

As shown in FIG. 18, the operation tab 17 in a rectangular plate shape is rotatably attached on an attachment surface 6*a* via a rotary shaft 18. An acceleration sensor 60 is provided on a surface of the operation tab 17. Elastic members 61 are interposed between two bearings 19 provided at both ends of the rotary shaft 18 and the attachment surface 6*a*.

The acceleration sensor 60 can detect a rotation operation to the operation tab 17 (rotation direction, rotation angle, rotation speed, and the like), an operation of pulling the operation tab 17 in the away-direction away from the attachment surface 6*a* (pull-out operation), and an operation of pushing the operation tab 17 in the toward-direction toward the attachment surface 6*a* (push-in operation). In the first embodiment shown in FIG. 3, the rotary encoder 20 detects the rotation operation to the operation tab 17 and the two pressure sensors 21, 22 detect the push-pull operation to the operation tab 17. On the other hand, in the third embodiment, all these operations can be detected by the single acceleration sensor 60. That is, the acceleration sensor 60 serves both as the rotation operation detecting mechanism and the push-pull operation detecting mechanism.

Further, similarly to the two pressure sensors 21, 22 of the first embodiment described above, the acceleration sensor 60 can detect a plurality of push-pull operations to the operation tab 17 (pulling from the attachment surface 6*a*, pushing toward the attachment surface 6*a*, pulling/pushing the upper/lower end of the operation tab 17, rotation in a plane of the operation tab 17, and so on). Therefore, a plurality of kinds of processing (see, for example, FIG. 5 in the first embodiment) executed by the image selection unit 33 can be assigned to these push-pull operations. That is, only by operating the operation tab 17, it is possible to cause various kinds of processing to be performed to one image data image-displayed on the display 13.

Fourth Embodiment

Figure 19:
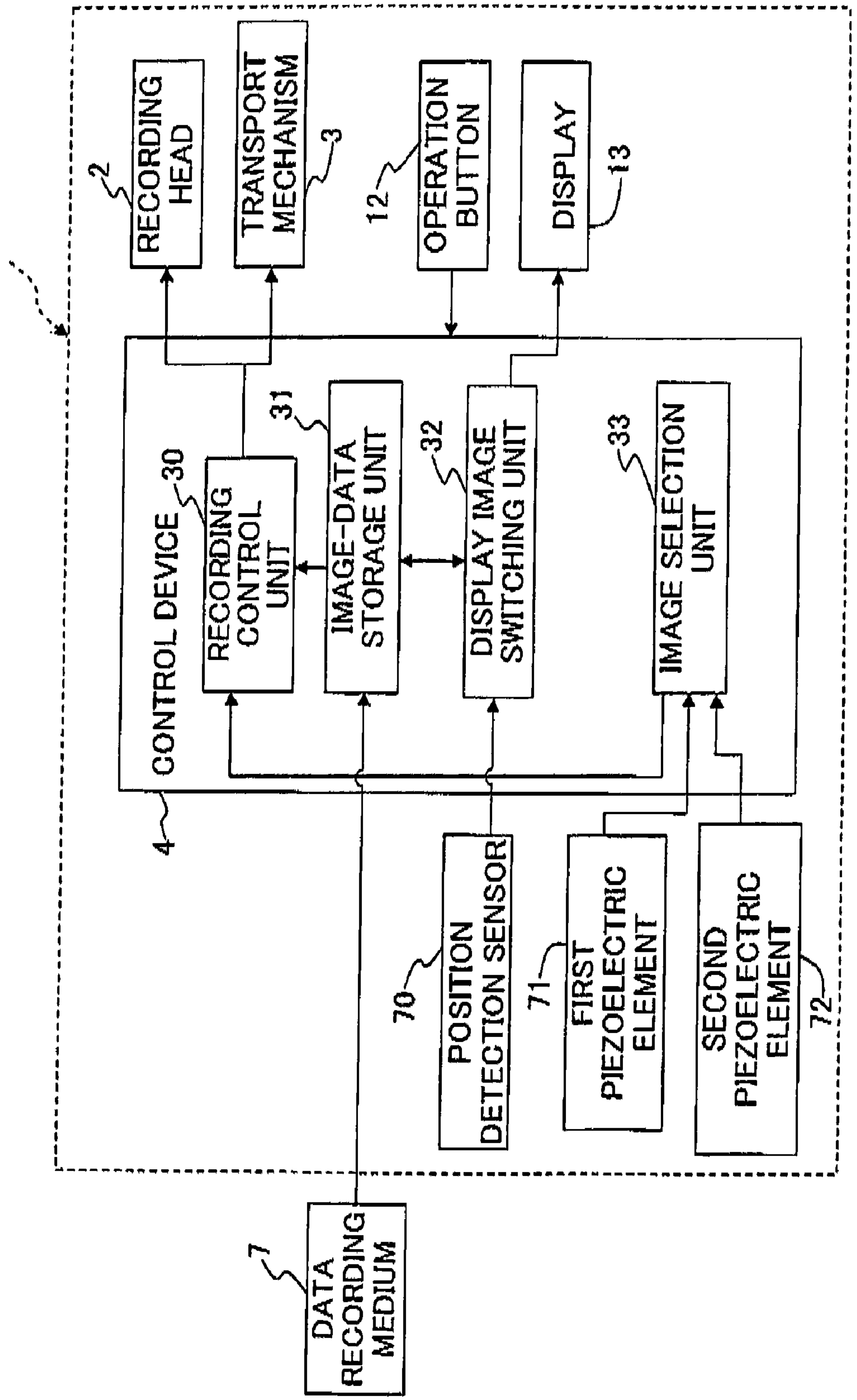
FIG. 19 is a block diagram schematically showing the electrical configuration of a printer according to a fourth embodiment.
Figure 20:
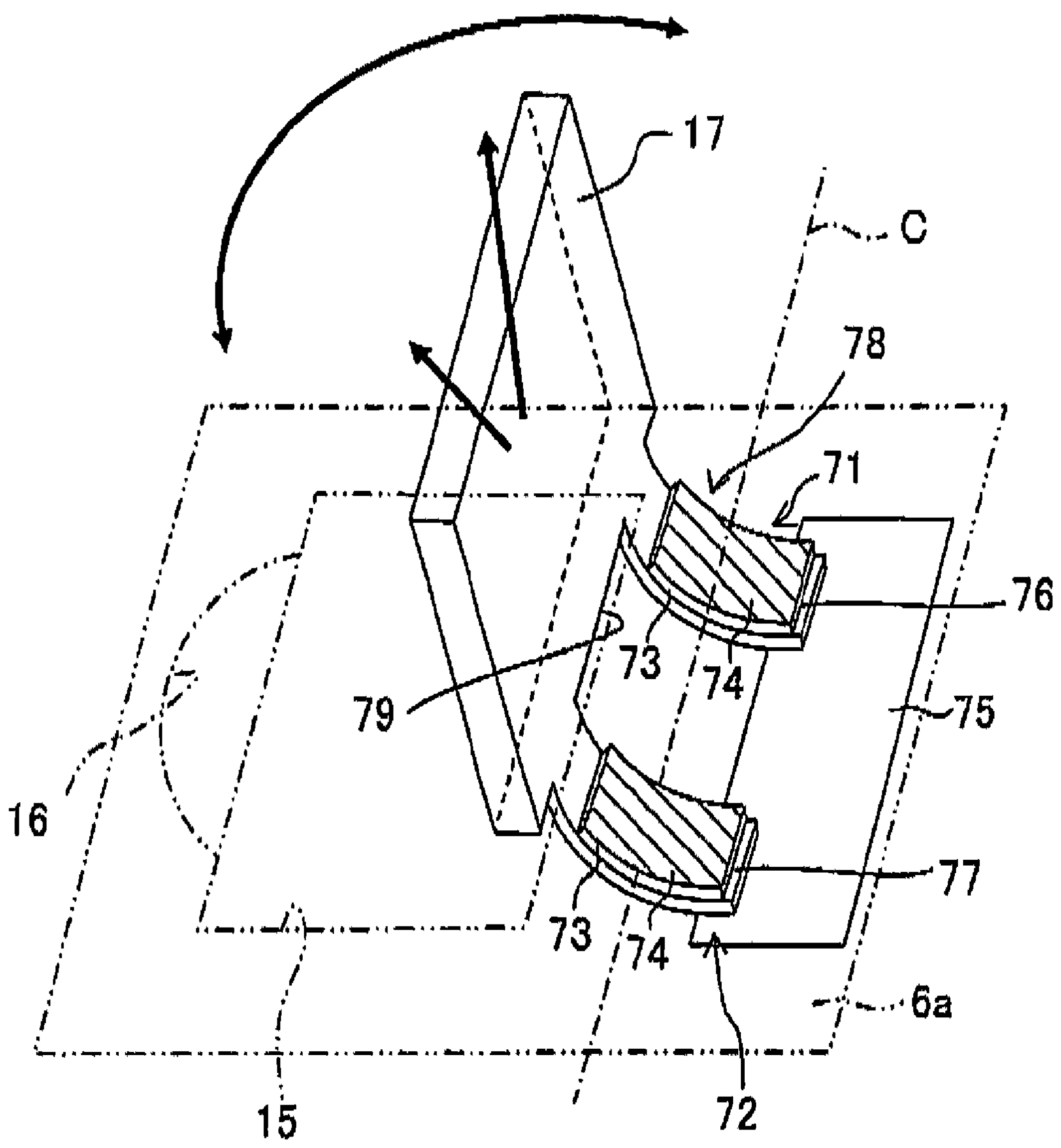
FIG. 20 is a perspective view of an operation tab of a fourth embodiment.
Figure 21:
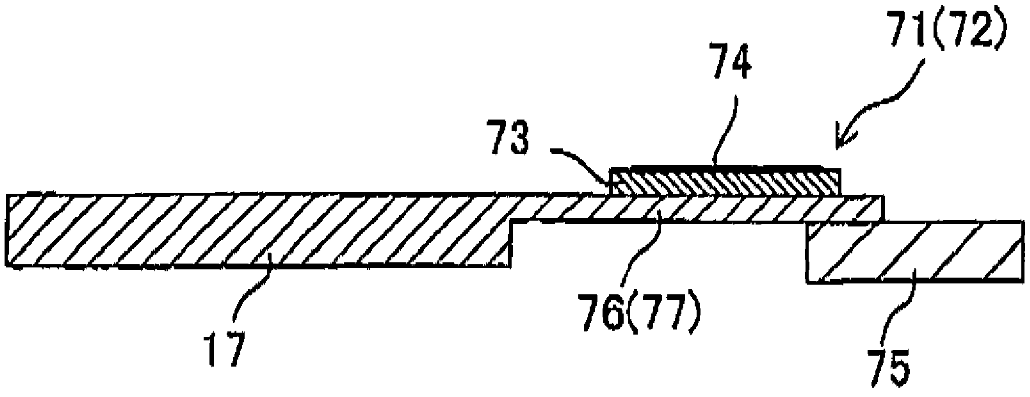
FIG. 21 is a cross-sectional view of the operation tab and a coupling part in FIG. 20.

Next, a fourth embodiment of the present invention will be explained. FIG. 19 is a block diagram showing the electrical configuration of a printer 1 of the fourth embodiment, FIG. 20 is a perspective view of an operation tab 17 of the fourth embodiment and FIG. 21 is a cross-sectional view of the operation tab 17. In the fourth embodiment, as a detecting mechanism detecting both a rotation operation and a push-pull operation to the operation tab 17, a piezoelectric element is used. In the explanation below, the same components as those of the first embodiment will be denoted by the same reference numerals and symbols and explanation thereof will be omitted when appropriate.

As shown in FIG. 20, an installation part 75 made of metal to which the operation tab 17 is attached is fixed on an attachment surface 6*a*. Further, a coupling part 78 made up of two element mounting parts (a first element mounting part 76 and a second element mounting part 77) arranged along a longer side direction (rotation axis direction) of the operation tab 17 is provided on one end of the rectangular plate-shaped operation tab 17 in a width direction (shorter side direction) perpendicular to the longitudinal direction. Further, between the two element mounting parts 76, 77, a cutout 79 is formed. The two element mounting parts 76, 77 are disposed, being apart from each other in the longer-side direction of the operation tab 17. The operation tab 17 and the two element mounting parts 76, 77 are integrally molded of a metal material such as stainless steel. Further, ends, of the two element mounting parts 76, 77, opposite the operation tab 17 are fixedly coupled to the installation part 75 fixed to the attachment surface 6*a*, and the operation tab 17 is coupled to the installation part 75 (attachment surface 6*a*) via the coupling part 78 made up of the two element mounting parts 76, 77.

As shown in FIG. 21, the two element mounting parts 76, 77 of the coupling part 78 are smaller in thickness than the operation tab 17. When the thinner two element mounting parts 76, 77 deform to bend (deflect) as shown in FIG. 20, the operation tab 17 is rotatable about a rotation axis C parallel to the attachment surface 6*a*. Further, a position detection sensor 70 (see FIG. 19) detecting whether or not the operation tab 17 is at a standby position is provided on the attachment surface 6*a*. Providing the position detection sensor 70 of, for example, a contact type on the attachment surface 61 makes it possible to detect that the operation tab 17 comes into contact with the position detection sensor 70 when the operation tab 17 is placed on the attachment surface 6*a*. Consequently, it is possible to detect whether or not the operation tab 17 is at the standby position. Instead of the contact-type position detection sensor, an optical sensor including a light-emitting element and a light-receiving element is adoptable.

Piezoelectric elements (a first piezoelectric element 71 and a second piezoelectric element 72) are provided on upper surfaces (front surfaces) of the first and second element mounting parts 76, 77 respectively. The two piezoelectric elements 71, 72 have piezoelectric layers 73 disposed on the upper surfaces of the element mounting parts 76, 77 and sensing electrodes 74 formed on upper surfaces of the piezoelectric layers 73, respectively.

The piezoelectric layers 73 are made of a piezoelectric material of which major component is, for example, lead zirconate titanate (PZT) which is a solid solution of lead titanate and lead zirconate and is a ferroelectric, and are formed in a substantially rectangular shape in a plane view. The piezoelectric layers 73 are formed by an aerosol deposition method, for instance. Further, the piezoelectric layers 73 are polarized in the thickness direction. The sensing electrodes 74 are made of a conductive material such as gold, copper, silver, palladium, platinum, or titanium.

As previously described, the element mounting parts 76, 77 on which the piezoelectric layers 73 are disposed are made of a conductive metal material, and a predetermined reference potential is constantly applied to these two element mounting parts 76, 77 via the conductive installation part 75. That is, the element mounting part 76 (77) made of metal faces the sensing electrode 74 across the piezoelectric layer 73 to also serve as a reference electrode which constantly keeps a lower surface of the piezoelectric layer 73 at the reference potential.

When the element mounting parts 76, 77 are bent in the user's operation to the operation tab 17, the piezoelectric layers 73 of the piezoelectric elements 71, 72 distort in accordance with the bending deformation of the element mounting parts 76, 77. At this time, voltage according to the deformation of the element mounting parts 76, 77 is generated in the piezoelectric elements 71, 72. Further, when the piezoelectric layers 73 are compressed in a plane direction, negative voltage is generated in the piezoelectric elements 71, 72, and when the piezoelectric layers 73 are stretched in the plane direction, positive voltage is generated in the piezoelectric elements 71, 72.

The "negative voltage" refers to a state where the potential of the sensing electrodes 28 is lower than the potential (reference potential) of the element mounting parts 76, 77 as the reference electrodes, and the "positive voltage" refers to a state where the potential of the sensing electrodes 28 is higher than the potential of the element mounting parts 76, 77. Further, as the speed of the bending deformation of the element mounting parts 76, 77 is higher and the piezoelectric layers 73 of the piezoelectric elements 71, 72 are compressed or stretched in a shorter time, a value (absolute value) of the voltage generated in the piezoelectric elements 71, 72 becomes larger. Then, based on voltage signals output from the two piezoelectric elements 71, 72 (that is, based on whether the voltage is positive or negative and based on the voltage value), a control device 4 (a display image switching unit 32 and an image selection unit 33) recognizes the operation (the rotation operation and the push-pull operation) to the operation tab 17.

Display Image Switching Process

The display image switching unit 32 switches image data to be image-displayed on a display 13, when recognizing that the operation tab 17 is rotated, based on the signals output from the piezoelectric elements 71, 72.

FIG. 22 shows the processing contents of the display image switching process. When the position detection sensor 70 detects that the operation tab 17 is at the standby position, no bending deformation is occurring in the two element mounting parts 76, 77. Therefore, no distortion is occurring in the piezoelectric layers 73 of the two piezoelectric elements 71, 72, so that no voltage is generated in the piezoelectric elements 71, 72. At this time, the display image switching unit 32 causes the display 13 to display the image folder name (processing A).

When the users rotates the operation tab 17 right, curvatures of both the first element mounting part 76 and the second element mounting part 77 increase (the radiuses of curvature decrease). The piezoelectric layers 73 of both the first piezoelectric element 71 and the second piezoelectric element 72 are compressed, so that negative voltage (−) is generated in the piezoelectric elements 71, 72 (between the sensing electrodes 74 and the element mounting parts 76, 77), as shown in the processing B in FIG. 22. Consequently, the display image switching unit 32 recognizes that the operation tab 17 is rotated right and switches image data to be image-displayed on the display 13, to immediately subsequent data.

When the operation tab 17 is rotated left, the curvatures of both the first element mounting part 76 and the second element mounting part 77 decrease (the radiuses of curvature increase). As shown in the processing C in FIG. 22, the piezoelectric layers 73 of both the first piezoelectric element 71 and the second piezoelectric element 72 are stretched, so that positive voltage (+) is generated in the piezoelectric elements 71, 72. Consequently, the display image switching unit 32 recognizes that the operation tab 72 is rotated left, and switches image data to be displayed on the display 13 to immediately preceding data.

However, only when the operation tab 17 is rotated at a slow speed lower than a predetermined speed and the voltage generated in the piezoelectric elements 71, 72 is less than a predetermined value (generated voltage: low), the display image switching unit 32 switches an image to be displayed on the display 13 (processing B, processing C). On the other hand, when the operation tab 17 is rotated at a high speed equal to the predetermined speed or more and the voltage generated in the piezoelectric elements 71, 72 is equal to the predetermined value or more (generated voltage: high), the display image switching unit 32 determines that the operation tab 17 is simply returned, and does not switch the display image processing D, processing E).

Image Selection Process

When recognizing the push-pull operation to the operation tab 17 based on the signals output from the piezoelectric elements 71, 72, the image selection unit 33 decides whether to select an image displayed on the display 13 or not.

FIG. 23 shows the processing contents of the image selection process. When the operation tab 17 is pulled diagonally downward (to the near side) toward one side (lower end) of the rotation axis C by the users so as to move away from the attachment surface 6*a*, the curvature of the first element mounting part 76 decreases and the curvature of the second element mounting part 77 increases. That is, the radius of curvature of the first element mounting part 76 increases and the radius of curvature of the second element mounting part 77 decreases. Then, the piezoelectric layer 73 of the first piezoelectric element 71 is stretched, so that positive voltage (+) is generated therein, and the piezoelectric layer 73 of the second piezoelectric element 72 is compressed, so that negative voltage (−) is generated therein. Consequently, the image selection unit 33 recognizes that the operation tab 17 is pulled diagonally downward and outputs a signal to a recording control unit 30. Consequently, a recording head 2 records image data image-displayed on the display 13, on printing paper P.

Further, as described above, when the operation tab 17 is pulled diagonally upward (to the far side) toward the other side (upper end) of the rotation axis C by the users so as to move away from the attachment surface 6*a* after the instruction for starting the recording of the display image is given, the curvature of the first element mounting part 76 increases and the curvature of the second element mounting part 77 decreases. That is, the radius of curvature of the first element mounting part 76 decreases and the radius of curvature of the second element mounting part 77 increases. At this time, the piezoelectric layer 73 of the first piezoelectric element 71 is compressed, so that negative voltage (−) is generated therein, and the piezoelectric layer 73 of the second piezoelectric element 72 is stretched, so that positive voltage (+) is generated therein. Consequently, the image selection unit 33 recognizes that the operation tab 17 is pulled diagonally upward, and cancels the previous image recording.

Alternatively, when it is detected that the operation tab 17 is pulled diagonally downward, the image selection unit 33 may increase (or decrease) the number of recording copies of the image displayed on the display 13, and when it is detected that the operation tab 17 is pulled diagonally upward, the image selection unit 33 may decrease (or increase) the number of recording copies.

In the fourth embodiment, each of the two piezoelectric elements 71, 72 can detect the rotation operation to the operation tab 17 and the pulling operation to the operation tab 17 in the rotation axis direction. Therefore, only by operating the operation tab 17, it is possible to switch an image to be displayed on the display 13 and cause various kinds of processing such as image recording to be performed to image data image-displayed on the display 13.

The element mounting parts 76, 77 are smaller in thickness than the operation tab 17. Further, the two element mounting parts 76, 77 on which the two piezoelectric elements 71, 72 are mounted are disposed apart from each other in the direction of the rotation axis C with a space therebetween. Therefore, when the operation tab 17 is operated, a deformation amount of each of the element mounting parts 76, 77 increases. Therefore, the two piezoelectric elements 71, 72 can more accurately detect the operation to the operation tab 17, which prevents erroneous detection.

Further, since the two element mounting parts 76, 77 forming the coupling part 78 are made of a metal material, the coupling part 78 has a higher fatigue strength against the repeated bending, resulting in improvement in its durability. Further, since the coupling part 78 is conductive, it is possible to use the coupling part 78 as the reference electrode of the piezoelectric elements 71, 72.

Figure 24:
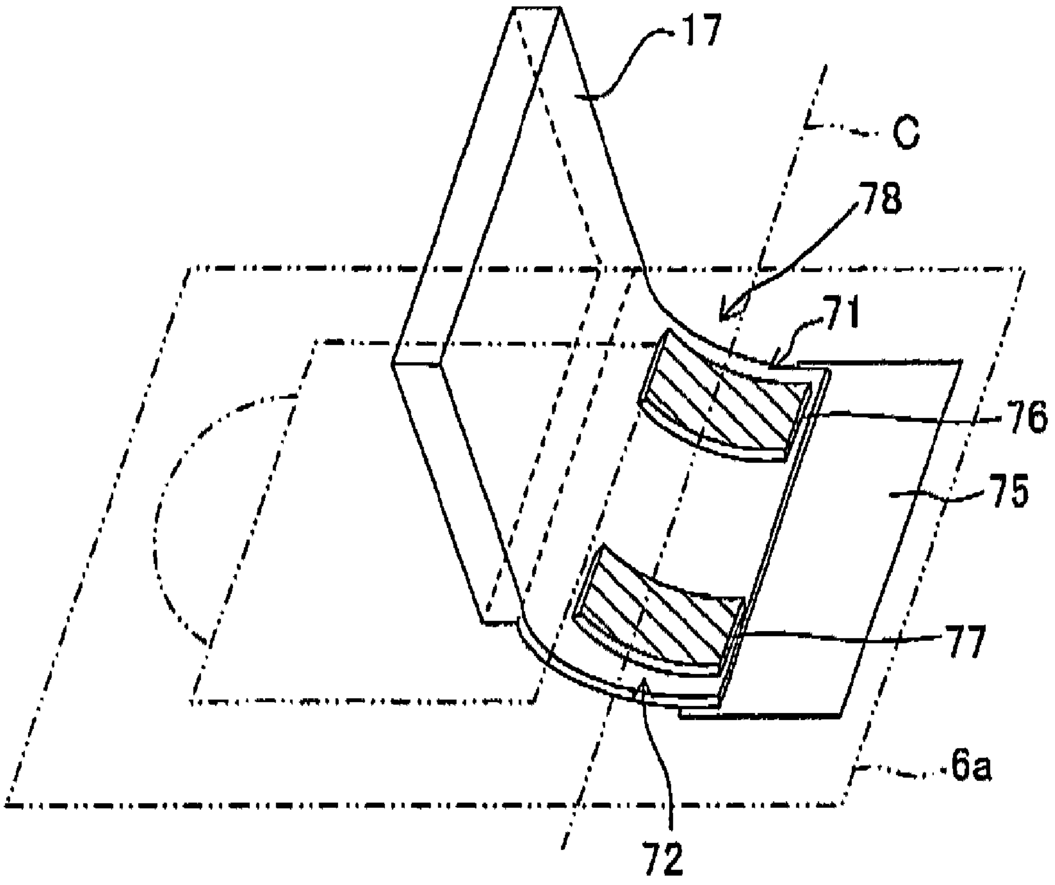
FIG. 24 is a perspective view of an operation tab of a modified form of the fourth embodiment.

The following changes can be further made in the fourth embodiment. Such a structure is adoptable in which the cut-out 79 (see FIG. 20) is not formed between the two element mounting parts 76, 77 of the coupling part 78 on which the two piezoelectric elements 71, 72 are mounted respectively, as shown in FIG. 24. That is, the two element mounting parts 76, 77 may be connected in the direction of the rotation axis C. In this case, the two element mounting parts 76, 77 deform less when the operation tab 17 is operated, compared with the case where the two element mounting parts 76, 77 are apart from each other with a space therebetween. However, since the strength of the whole coupling part 78 is increased, its durability is improved.

Figure 25:
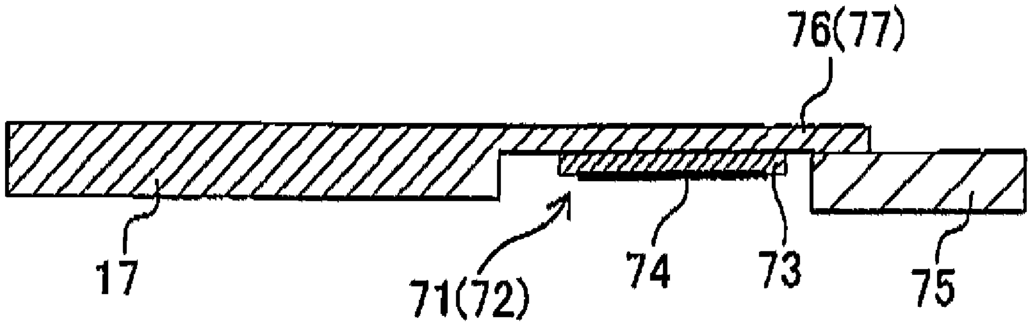
FIG. 25 is a cross-sectional view of an operation tab and a coupling part of another modified form of the fourth embodiment.

Further, as shown in FIG. 25, the piezoelectric elements 71, 72 may be mounted on rear surfaces of the element mounting parts 76, 77 of the coupling part 78. In this case, the hand of the user, members around the operation tab 17, and so on are prevented from coming into contact with the piezoelectric elements 71, 72 when, for example, the users operates the operation tab 17, and thus the piezoelectric elements 71, 72 are not easily damaged.

Further, the number of the piezoelectric elements disposed on the coupling part 78 is not limited to two, but three piezoelectric elements or more may be disposed to be apart from one another in the rotation axis direction.

It is not necessary that the operation tab 17 and the coupling part 78 be made of conductive materials. However, if the coupling part 78 is made of an insulative material, a reference electrode made of a conductive material is provided between the coupling part 78 and the piezoelectric layers 73.

Fifth Embodiment

The first to fourth embodiments described above are embodiments where the present invention is applied to the printer which records an image on a recording medium. On the other hand, the present invention is also applicable to an image output apparatus outputting image data to an image processing device such as a printer and a large-screen display device.

Figure 26:
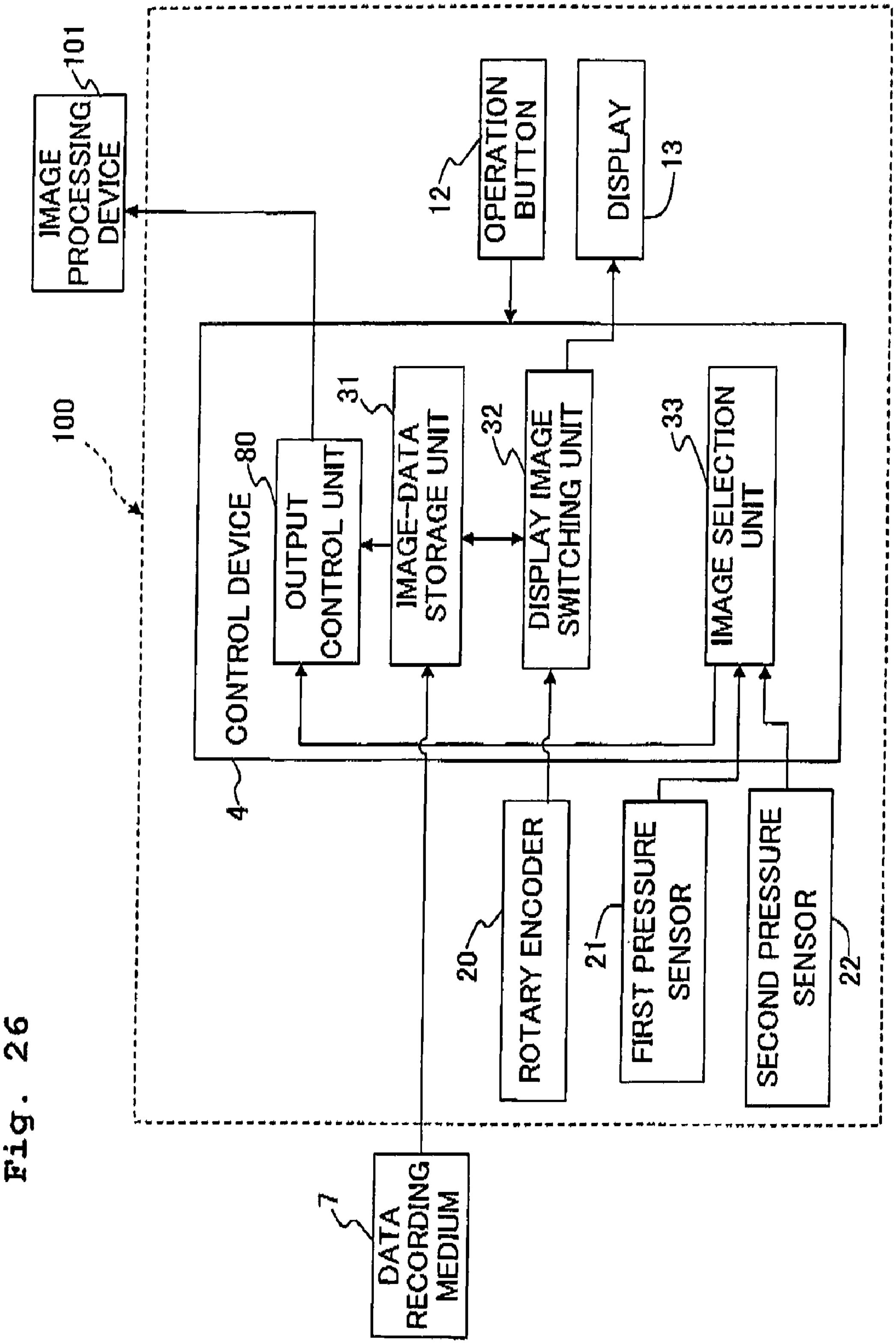
FIG. 26 is a block diagram schematically showing the electrical configuration of an image output apparatus of a fifth embodiment.
Figure 28:
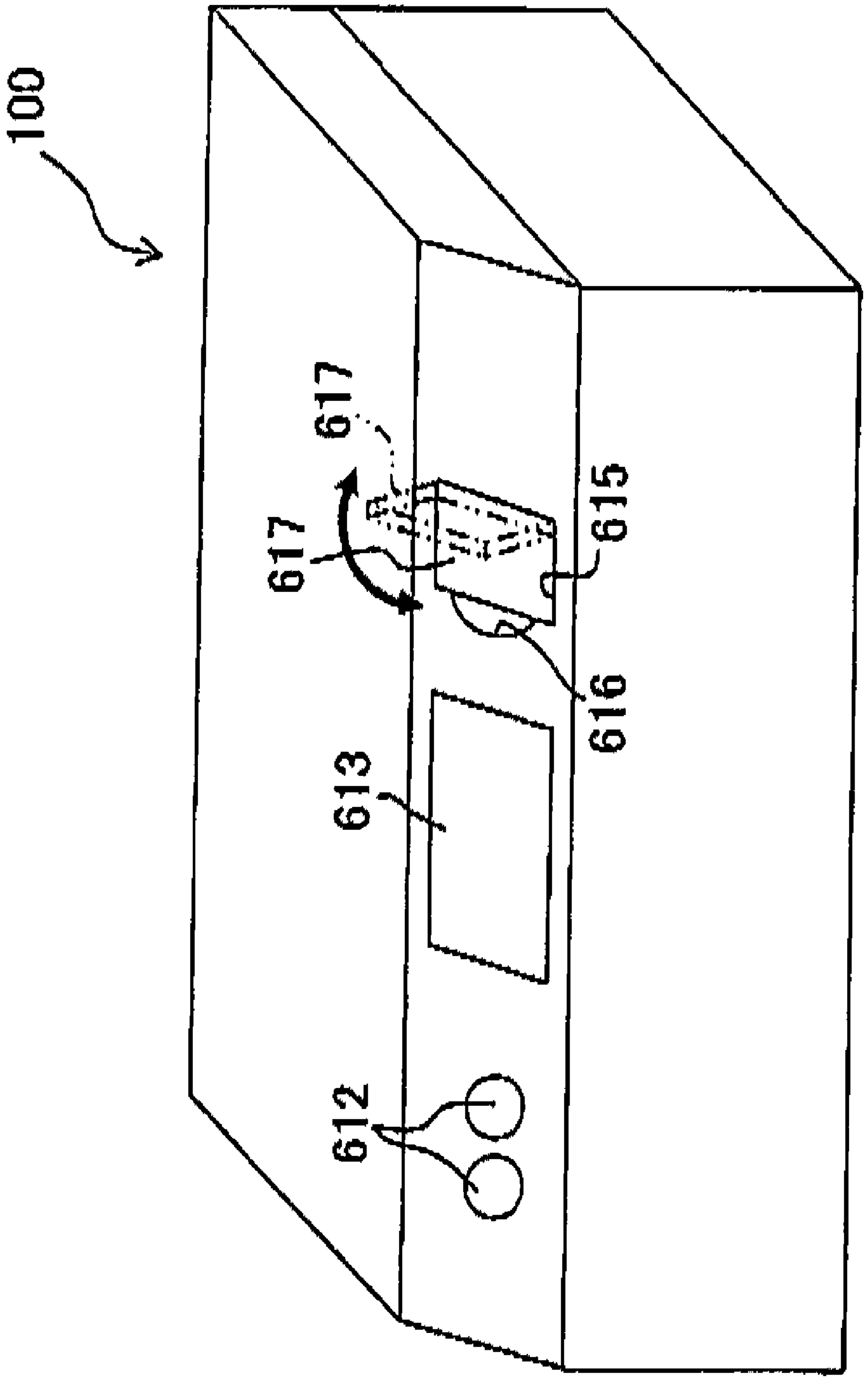
FIG. 28 is a image output apparatus of a fifth embodiment.

As shown in FIG. 28, an image output apparatus 100 of the fifth embodiment includes operation buttons 612, a display 613, a recess 615, a dent 616, an operation tab 617, and a rotary shaft 618, similarly to the printer of the first embodiment shown in FIG. 1. Further, the schematic electric configuration thereof is shown in FIG. 26. Specifically, as contrast to the printer shown in FIG. 2, the image output apparatus 100 of the fifth embodiment has neither of the recording head 2 and the carrier mechanism 3 and includes, instead of the recording control unit 30, an output control unit (output unit) 80 outputting image data selected by users from an image data storage unit 31. When this image output apparatus is connected to an image processing device 101 such as a printer or a large-screen display device, the image processing device 101 can print an image that the users selects on the display 13, or can display this image on a large screen. Alternatively, similarly to the printer shown in the first embodiment, the image output apparatus may have therein a recording unit printing an image.

The above embodiments and modified forms describe that the operations such as the selection of an image or an image folder are performed by using the operation tab, but the operation using the operation tab is not limited to these. For example, an operation of a selection menu window, which is displayed on the display, may be performed by using the operation tab. Further, the modified forms of the first embodiment may be applied to the other embodiments if applicable.

What is claimed is:

1. A printer which prints an image on a recording medium, comprising:

a body having an attachment surface;

a display which displays an image of image data selected from a plurality of image data which are sorted in order;

an image printing section which prints the image of the image data on the recording medium;

a plate-shaped operation section which is attached to the attachment surface and which is capable of being on a standby state while being placed in parallel to and on the attachment surface and is rotatable around a rotary shaft parallel to the attachment surface; a rotation operation detecting mechanism which detects a rotation operation performed to the operation section; and a display image switching mechanism which switches the plurality of sorted image data to be displayed on the display section according to an order of the sorted image data, based on the rotation operation to the operation section detected by the rotation operation detecting mechanism.

2. The printer according to claim 1, wherein when the rotation operation detecting mechanism detects that the operation unit starts to be rotated from the standby state on the attachment surface, the display image switching mechanism makes the display to display an image of first image data among the plurality of sorted image data.

3. The printer according to claim 1, wherein when the rotation operation detecting mechanism detects that the operation section is rotated at a speed lower than a predetermined speed, the display image switching mechanism switches the image data to be displayed on the display to image data immediately before or immediately after image data currently displayed among the plurality of image data; and when the rotation operation detecting mechanism detects that the operation section is rotated at a speed not less than the predetermined speed, the display image switching mechanism does not switch the image data to be displayed on the display.

4. The printer according to claim 3, wherein when the rotation operation detecting mechanism detects that the operation section is rotated in one rotation direction at the speed lower than the predetermined speed, the display image switching mechanism makes the display to display the image data immediately after the image data currently displayed; and when the rotation operation detecting mechanism detects that the operation unit is rotated in the other rotation direction at the speed lower than the predetermined speed, the display image switching mechanism makes the display to display the image data immediately before the image data currently displayed.

5. The printer according to claim 1, further comprising an image selecting mechanism selecting image data among the plurality of image data displayed on the display.

6. The printer according to claim 5, further comprising a push-pull operation detecting mechanism which detects a push-pull operation in which the operation section which has been rotated from the state of being placed in parallel to and on the attachment surface is pulled in an away-direction along a plane direction of the operation section or is pushed in a toward-direction along the plane direction of the operation section, the away-direction being a direction away form the attachment surface, and the toward-direction being a direction toward the attachment surface, wherein the image selecting mechanism determines whether or not to select the image data displayed on the display, based on a result of the detection of the push-pull operation detecting mechanism.

7. The printer according to claim 6, wherein the image selecting mechanism selects the image of the image data displayed on the display when the push-pull operation detecting mechanism detects that the operation section is pulled in the away-direction; and when the push-pull operation detecting mechanism then detects that the operation unit is pushed in the toward-direction, the image selecting mechanism cancels the selection of the image data previously performed.

8. The printer according to claim 6, wherein when the push-pull operation detecting mechanism detects that one end of the operation section along the rotary shaft is pulled in the away-direction, the image selecting mechanism selects the image data displayed on the display; and when the push-pull operation detecting mechanism then detects that the other end of the operation section along the rotary shaft is pulled in the away-direction, the image selecting mechanism cancels the selection of the image data previously performed.

9. The printer according to claim 6, wherein when the image data displayed on the display has been selected, the image selecting mechanism makes the image printing section to record the image of the image data on the recording medium.

10. The printer according to claim 6, wherein when the push-pull operation detecting mechanism detects that the operation section is pulled in the away-direction, the image selecting mechanism increases a number of copies of the recording medium on which the image of the image data is to be recorded by the image printing section; and when the push-pull operation detecting mechanism detects that the operation unit is pushed in the toward-direction, the image selecting mechanism decreases the number of copies of the recording medium on which the image of the image data is to be printed by the image printing section.

11. The printer according to claim 6, wherein when the push-pull operation detecting mechanism detects that one end of the operation unit along the rotary shaft is pulled in the away-direction, the image selecting mechanism increases a number of copies of the recording medium on which the image of the image data is to be printed by the image printing section; and when the push-pull operation detecting mechanism detects that the other end of the operation unit along the rotary shaft is pulled in the away direction, the image selecting mechanism decreases the number of copies of the recording medium on which the image of the image data is to be printed by the image printing section.

12. The printer according to claim 10, wherein the image selecting mechanism changes an increment amount or a decrement amount of the number of copies of the recording medium according to a degree of the push-pull operation to the operation section detected by the push-pull operation detecting mechanism.

13. The printer according to claim 11, wherein the image selecting mechanism changes an increment amount or a decrement amount of the number of copies of the recording medium according to a degree of the push-pull operation to the operation section detected by the push-pull operation detecting mechanism.

14. The printer according to claim 6, wherein the push-pull operation detecting mechanism includes two sensors which independently detect the push-pull operations to both ends of the operation section along the rotary shaft.

15. The printer according to claim 14, wherein, when one of the two sensors detects that one end of the operation section along the rotary shaft is pulled in the away-direction and at the same time, the other of the two sensors detects that the other end of the operation section along the rotary shaft is pushed in the toward-direction, the display rotates the image currently displayed.

16. The printer according to claim 6, further comprising a transport mechanism which transports, in a predetermined transport direction, the recording medium on which the image has been printed by the image printing section, wherein when the push-pull operation detecting mechanism detects that the operation section is pulled along the transport direction, the image selecting mechanism selects the image data displayed on the display, and the image printing section prints the image of the selected image data on the recording medium.

17. The printer according to claim 1, wherein the display is substantially flush with the operation section which is in the standby state on the attachment surface.

18. The printer according to claim 17, wherein the display is positioned opposite the rotary shaft with respect to the operation section when the operation section is in the standby state.

19. The printer according to claim 18, wherein when the operation section is in the standby state on the attachment surface, the display image switching mechanism makes the display to display an image of a closed book; and when the rotation operation detecting mechanism detects the rotation operation to the operation unit, the display image switching mechanism synthesizes image data of the book in an opened state and the predetermined image data corresponding to the rotation operation to the operation section, and makes the display to display a resultant synthesis image.

20. The printer according to claim 19, wherein a direction in which the book displayed on the display is opened from the closed state is same as a rotation direction in which the operation section is rotated from the standby state on the attachment surface.

21. The printer according to claim 1, wherein a color of a surface, of the operation section in the standby state, facing the attachment surface is white; and a color of the attachment surface is other than white.

22. The printer according to claim 1, wherein based on rotation angle information of the operation section detected by the rotation operation detecting mechanism, the display image switching mechanism synthesizes image data displayed before and after the switching of the image data to generate synthesis image data showing that the switching is underway and causes the display to display an image of the synthesis image data.

23. The printer according to claim 1, further comprising a data group selecting mechanism which selects an image data group to be displayed on the display section, among a plurality of image data groups each including the plurality of image data, wherein when the rotation operation detecting mechanism detects the rotation operation to the operation section after the data group selecting mechanism selects one of the image data groups, the display image switching mechanism makes the display to display images of the plurality of image data belonging to the selected image data group.

24. An image output apparatus which outputs an image, the apparatus comprising:

a body having a predetermined attachment surface;

a display which displays an image of image data selected from a plurality of image data sorted in order;

an output section which outputs the image data;

a plate-shaped operation section which is attached to the attachment surface and which is capable of being on a standby state while being placed in parallel to and on the attachment surface and is rotatable around a rotary shaft parallel to the attachment surface;

a rotation operation detecting mechanism which detects a rotation operation performed to the operation section; and a display image switching mechanism which switches the plurality of sorted image data to be displayed on the display according to an order of the sorted image data, based on the rotation operation to the operation section detected by the rotation operation detecting mechanism.

25. An image output apparatus which outputs an image or image data, the apparatus comprising:

a body having a predetermined attachment surface;

a display which displays an image of image data selected from a plurality of image data sorted in order;

a plate-shaped operation tab which is attached to the attachment surface of the body, which is capable of being on a standby state while being placed in parallel to and on the attachment surface and is rotatable around a rotary shaft parallel to the attachment surface, and corresponding to a book-like operation;

a detection section which detects the book-like operation to the operation unit; and an image processing section which performs predetermined processing to the image data of the image displayed on the display, based on the book-like operation detected by the detection section.

26. The image output apparatus according to claim 25, wherein the book-like operation includes a rotation operation of rotating the operation section around the rotary shaft;

the detection section includes a rotation operation detecting mechanism which detects the rotation operation to the operation unit; and the image processing section includes a display image switching mechanism which switches the plurality of sorted image data to be displayed on the display section according to an order of the sorted image data, based on the rotation operation to the operation section detected by the rotation operation detecting mechanism.

27. The image output apparatus according to claim 26, the image output apparatus being a printer which prints an image on a recording medium, and which includes a printing section which prints the image of the image data on the recording medium.

* * * * *